(12) United States Patent
Goto

(10) Patent No.: US 9,288,437 B2
(45) Date of Patent: Mar. 15, 2016

(54) COMMUNICATION DEVICE, COMMUNICATION METHOD, AND COMPUTER-READABLE STORAGE MEDIUM

(71) Applicant: Tomoyuki Goto, Kanagawa (JP)

(72) Inventor: Tomoyuki Goto, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/290,031

(22) Filed: May 29, 2014

(65) Prior Publication Data

US 2014/0362168 A1 Dec. 11, 2014

(30) Foreign Application Priority Data

Jun. 11, 2013 (JP) .................................. 2013-122481

(51) Int. Cl.
*H04N 7/14* (2006.01)
*H04N 7/15* (2006.01)

(52) U.S. Cl.
CPC ....................................... *H04N 7/15* (2013.01)

(58) Field of Classification Search
CPC ......... H04N 7/15; H04N 7/152; H04N 7/155; H04N 7/147; H04N 7/141; H04N 7/142
USPC ...................... 348/14.01, 14.08, 14.09, 14.15
See application file for complete search history.

(56) References Cited

U.S. PATENT DOCUMENTS

| | | | | |
|---|---|---|---|---|
| 8,350,891 | B2* | 1/2013 | Khot et al. | 348/14.12 |
| 2009/0309897 | A1* | 12/2009 | Morita et al. | 345/629 |
| 2010/0002069 | A1* | 1/2010 | Eleftheriadis et al. | 348/14.08 |

FOREIGN PATENT DOCUMENTS

| | | |
|---|---|---|
| JP | 09-261608 A | 10/1997 |
| JP | 10-093943 A | 4/1998 |
| JP | 2014-171157 | 9/2014 |

* cited by examiner

*Primary Examiner* — Quoc D Tran
(74) *Attorney, Agent, or Firm* — Oblon, McClelland, Maier & Neustadt, L.L.P.

(57) ABSTRACT

A communication device includes a determination unit that determines whether there is a speaker in different hubs by using sets of sound-related information that are transmitted from the respective different hubs via a communication network; and a display unit that displays, in a predetermined size on a display surface, an image that is transmitted from a different hub in which the determination unit determines that there is no speaker, and that displays, in an enlarged size larger than the predetermined size on the display surface, an image that is transmitted from a different hub in which the determination unit determines that there is a speaker. When the determination unit determines that there are speakers in multiple different hubs, the display unit collectively displays, in the enlarged size on the display surface, multiple images that are transmitted from the respective different hubs.

8 Claims, 18 Drawing Sheets

FIG.2
(A)
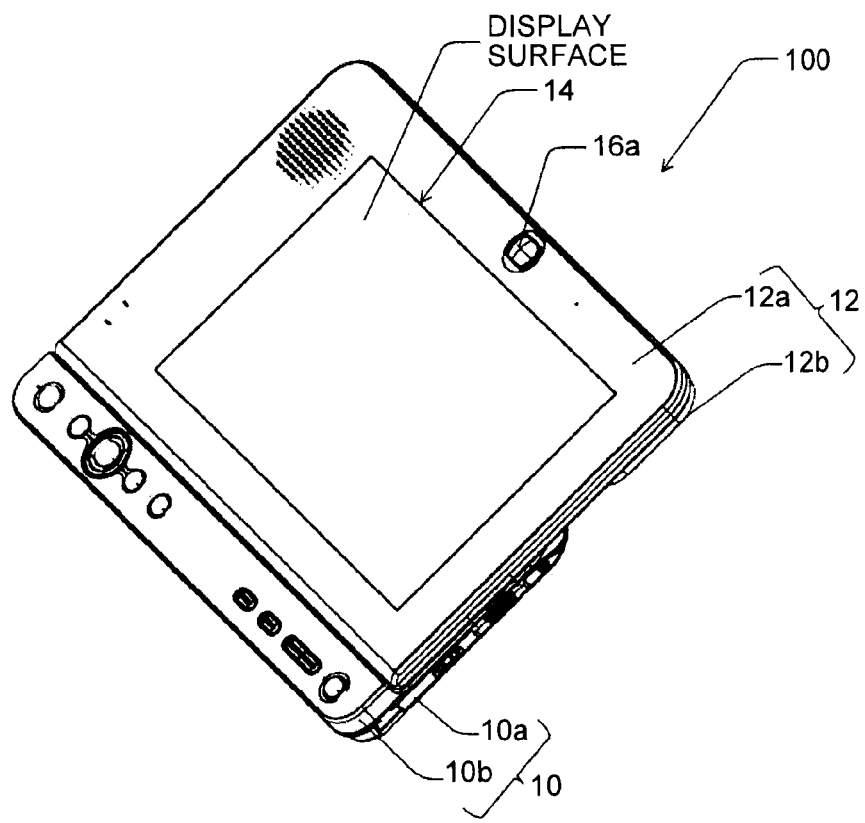
(B)
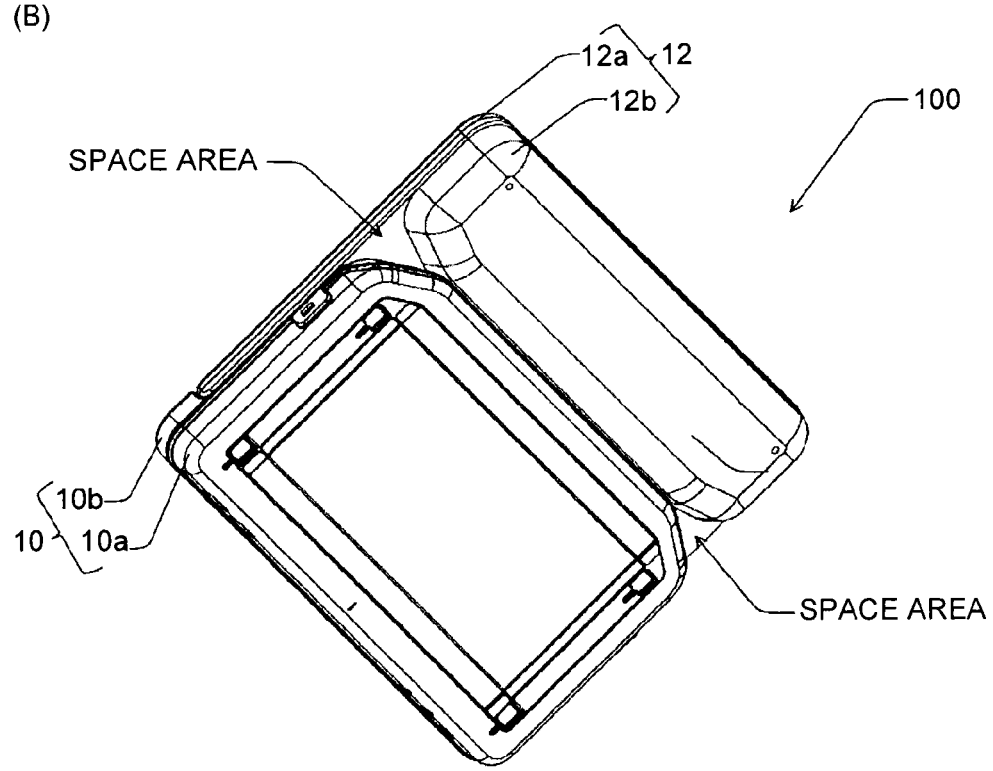

FIG.10
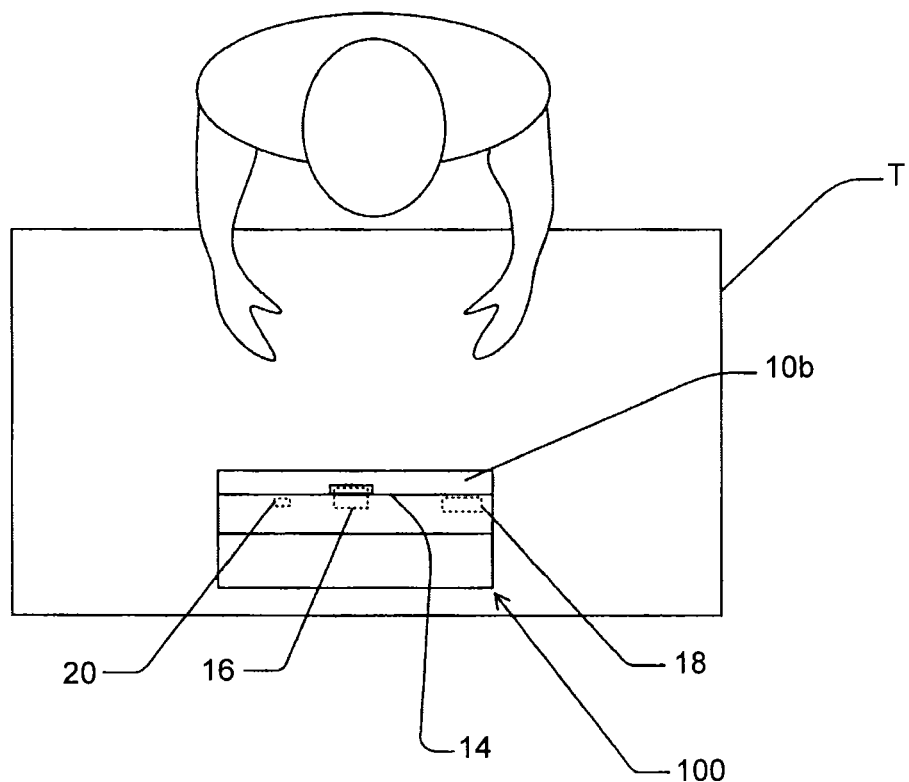
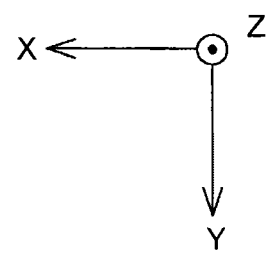

FIG.16
(A)
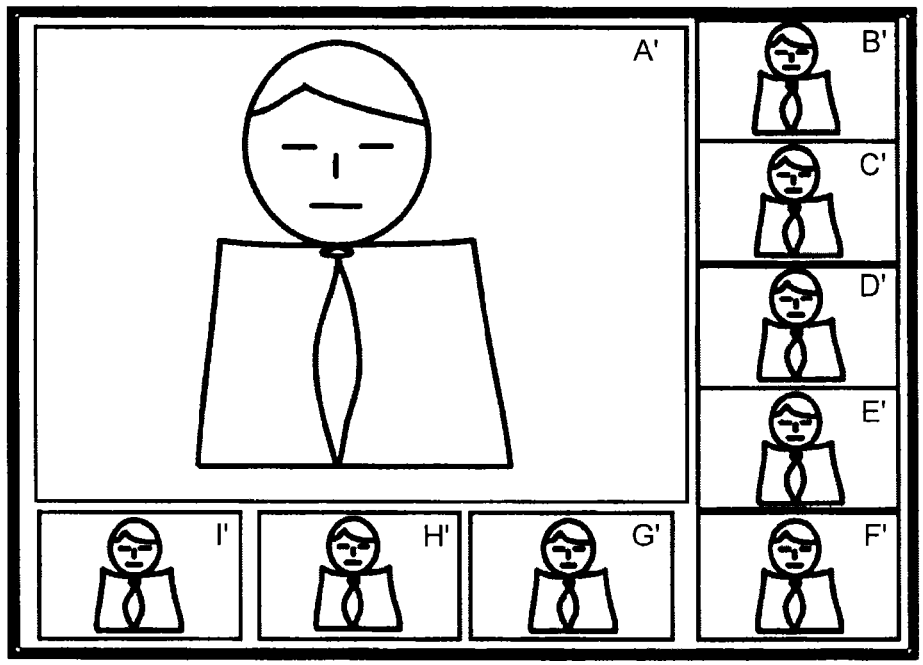
(B)
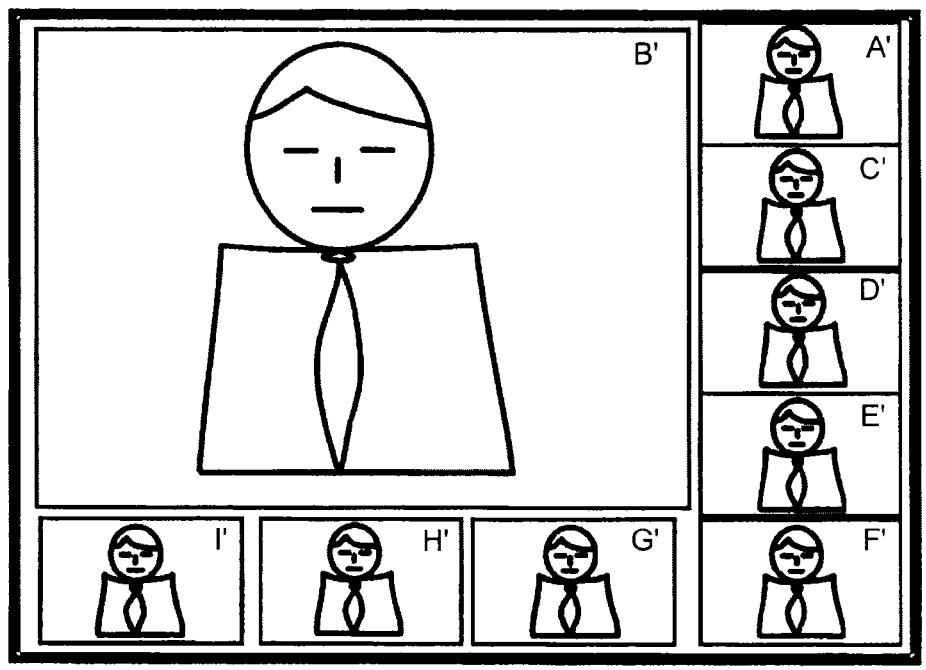

FIG.19
(A)
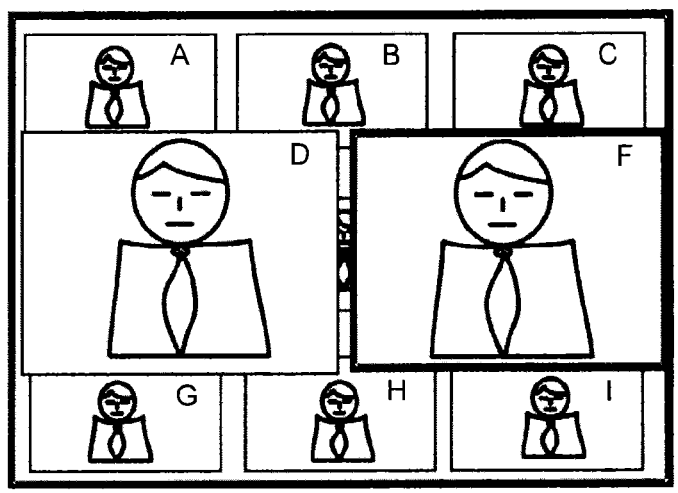
(B)
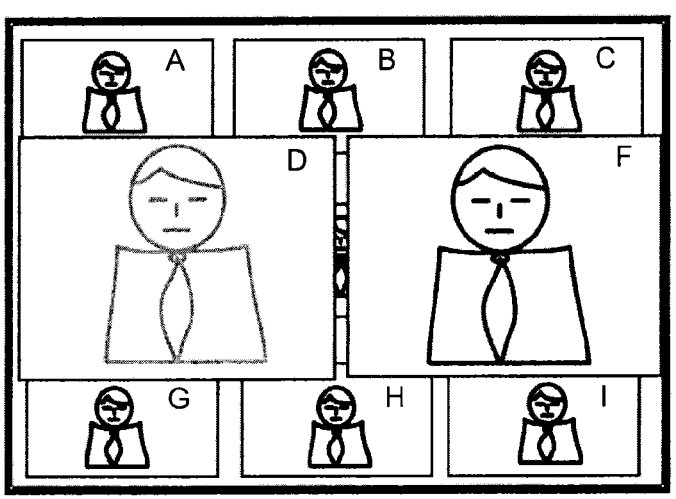
(C)
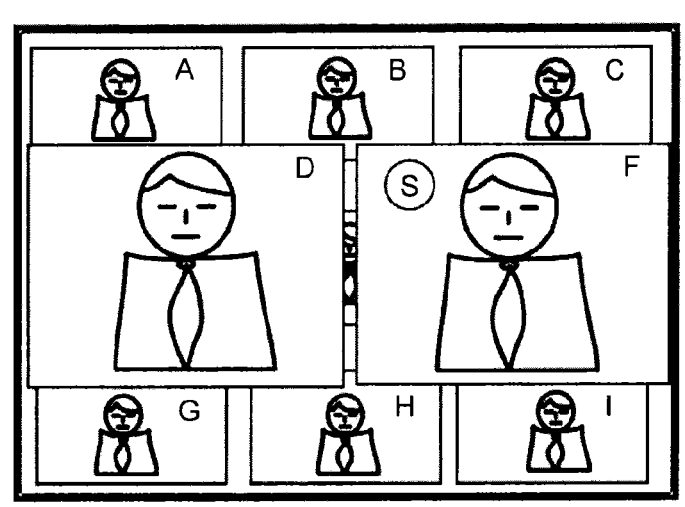

COMMUNICATION DEVICE, COMMUNICATION METHOD, AND COMPUTER-READABLE STORAGE MEDIUM

CROSS-REFERENCE TO RELATED APPLICATION

The present application claims priority to and incorporates by reference the entire contents of Japanese Patent Application No. 2013-122481 filed in Japan on Jun. 11, 2013.

BACKGROUND OF THE INVENTION

1. Field of the Invention

The present invention relates to a communication device, a communication method, and a computer-readable storage medium.

2. Description of the Related Art

There is a conventionally-known teleconference terminal device that is used in an arbitrary hub in order to hold a teleconference (information sharing) by transmitting and receiving images and sounds among at least three hubs via a communication network (for example, see Japanese Patent Application Laid-open No. 9-261608).

In the teleconference terminal device, the image that is transmitted from at least one different hub where there is no speaker is presented on a display in a predetermined size, and the image transmitted from one different hub where there is a speaker is presented on the display in an enlarged size that is larger than the predetermined size.

However, with the teleconference terminal device disclosed in Japanese Patent Application Laid-open No. 9-261608, when there are speakers in multiple different hubs, it is difficult to easily recognize the speakers.

SUMMARY OF THE INVENTION

According to an embodiment, there is provided a communication device that is used in one of at least three hubs to share information by transmitting and receiving an image and a sound among the at least three hubs via a communication network. The communication device includes a determination unit that determines whether there is a speaker in at least two different hubs that are different from the one of the at least three hubs by using at least two sets of sound-related information that are transmitted from the respective different hubs via the communication network; and a display unit that displays, in a predetermined size on a display surface, an image that is transmitted via the communication network from a different hub in which the determination unit determines that there is no speaker, and that displays, in an enlarged size that is larger than the predetermined size on the display surface, an image that is transmitted via the communication network from a different hub in which the determination unit determines that there is a speaker. When the determination unit determines that there are speakers in multiple different hubs, the display unit collectively displays, in the enlarged size on the display surface, multiple images that are transmitted from the respective different hubs via the communication network.

According to another embodiment, there is provided a communication method that is used in one of at least three hubs to share information by transmitting and receiving an image and a sound among the at least three hubs via a communication network. The communication method includes determining whether there is a speaker in at least two different hubs that are different from the one of the at least three hubs by using at least two sets of sound-related information that are transmitted from the respective different hubs via the communication network; displaying, in a predetermined size on a display surface, an image that is transmitted via the communication network from a different hub in which it is determined that there is no speaker; and displaying, in an enlarged size that is larger than the predetermined size on the display surface, an image that is transmitted via the communication network from a different hub in which it is determined that there is a speaker. The displaying in the enlarged size includes collectively displaying, in the enlarged size on the display surface, multiple images that are transmitted from the respective different hubs via the communication network when it is determined that there are speakers in multiple different hubs.

According to still another embodiment, there is provided a non-transitory computer-readable storage medium with an executable program stored thereon and executed by a computer of an communication device that is used in one of at least three hubs to share information by transmitting and receiving an image and a sound among the at least three hubs via a communication network. The program instructs the computer to perform: determining whether there is a speaker in at least two different hubs that are different from the one of the at least three hubs by using at least two sets of sound-related information that are transmitted from the respective different hubs via the communication network; displaying, in a predetermined size on a display surface, an image that is transmitted via the communication network from a different hub in which it is determined that there is no speaker; and displaying, in an enlarged size that is larger than the predetermined size on the display surface, an image that is transmitted via the communication network from a different hub in which it is determined that there is a speaker. The displaying in the enlarged size includes collectively displaying, in the enlarged size on the display surface, multiple images that are transmitted from the respective different hubs via the communication network when it is determined that there are speakers in multiple different hubs.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 illustrates perspective views (A) and (B) of a teleconference device in a basic form;

FIG. 10 is a diagram that illustrates the form of a teleconference that is held by using the teleconference device at each hub;

FIG. 16 illustrate states (A) and (B) where the image received from a single different hub is presented in an enlarged size on the display of the teleconference device of a comparative example and the images received from the rest of the different hubs are presented in a reduced size;

FIG. 19 illustrates states (A) to (C) where the images received from two different hubs are presented in the same enlarged size on the display of the teleconference device, an operation is performed to discriminate between the two different hubs, and the images received from the rest of the different hubs are presented in a reduced size.

DETAILED DESCRIPTION OF THE PREFERRED EMBODIMENTS

Figure 1:
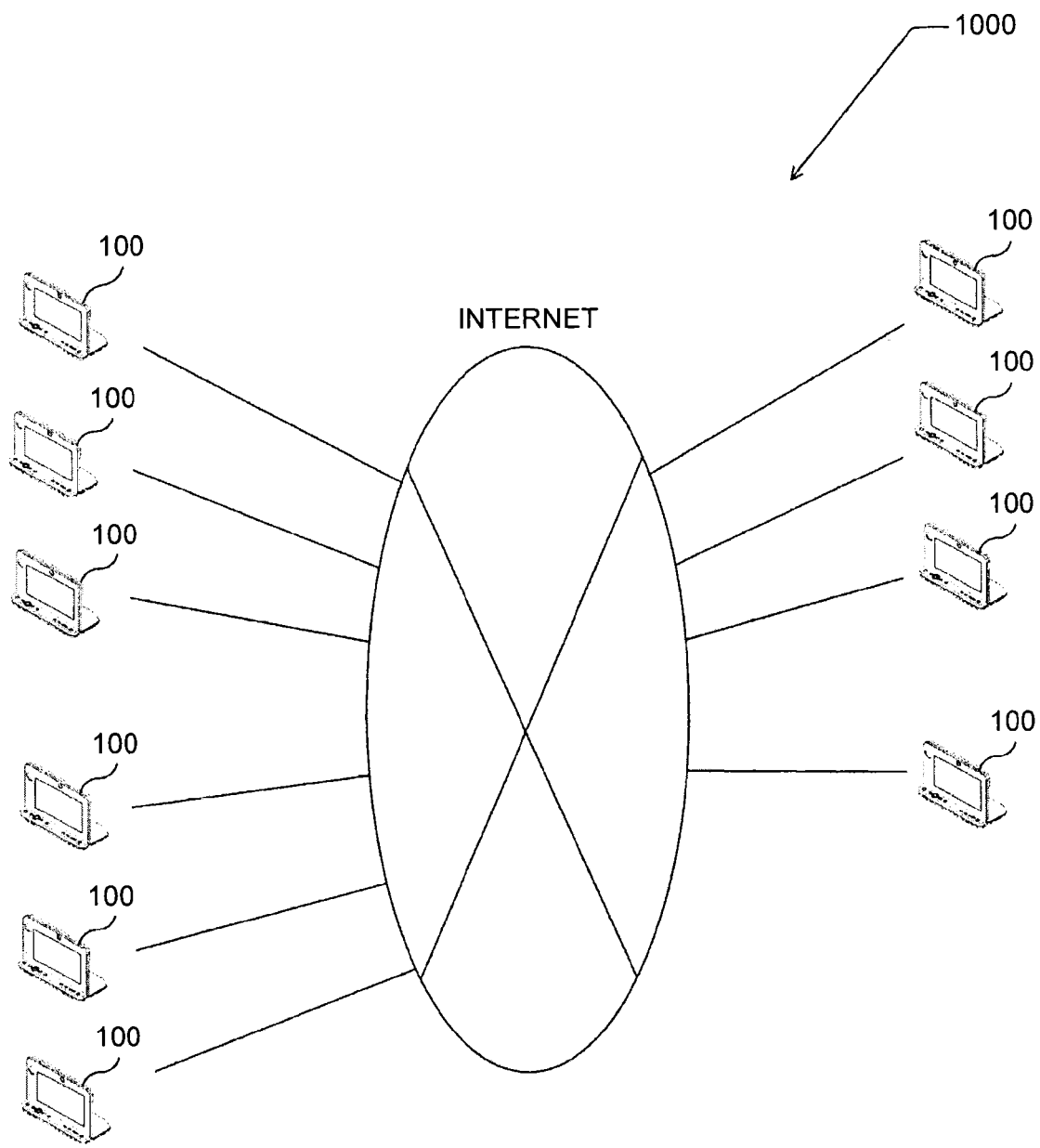
FIG. 1 is a diagram that illustrates a configuration of a conference system according to an embodiment.

Exemplary embodiments of the present invention are explained in detail below with reference to FIGS. 1 to 15. FIG. 1 schematically illustrates a conference system 1000 that is an example of a communication system according to an embodiment. The conference system 1000 is used for a teleconference (information sharing) among at least three hubs (e.g., ten hubs) via a network (communication network), e.g., the Internet. Here, the teleconference is the system for performing information sharing by using moving images and sounds.

As illustrated in FIG. 1, the conference system 1000 includes, for example, a plurality of (e.g., ten) teleconference devices 100 that are the communication devices.

The ten teleconference devices 100, for example, have substantially the same configuration and capability, and they are connected to one another via the Internet such that they can perform a two-way communication.

FIG. 2 illustrates perspective views of the external appearance of the teleconference device 100 in one form (hereinafter, referred to as the basic form) when viewed from different directions.

As illustrated in (A) and (B) of FIG. 2, while in the basic form, the teleconference device 100 has an overall shape (e.g., a thickness of 20 mm to 40 mm) like substantially a rectangular flat plate that has an A4 size, for example.

Thus, the teleconference device 100 is designed to be thin and compact in the basic form. Furthermore, as described in detail later, the form of the teleconference device 100 can be shifted between the basic form and an open form that is suitable for usage while it is placed on the top surface (placement surface) of, for example, a desk or table.

Figure 3:
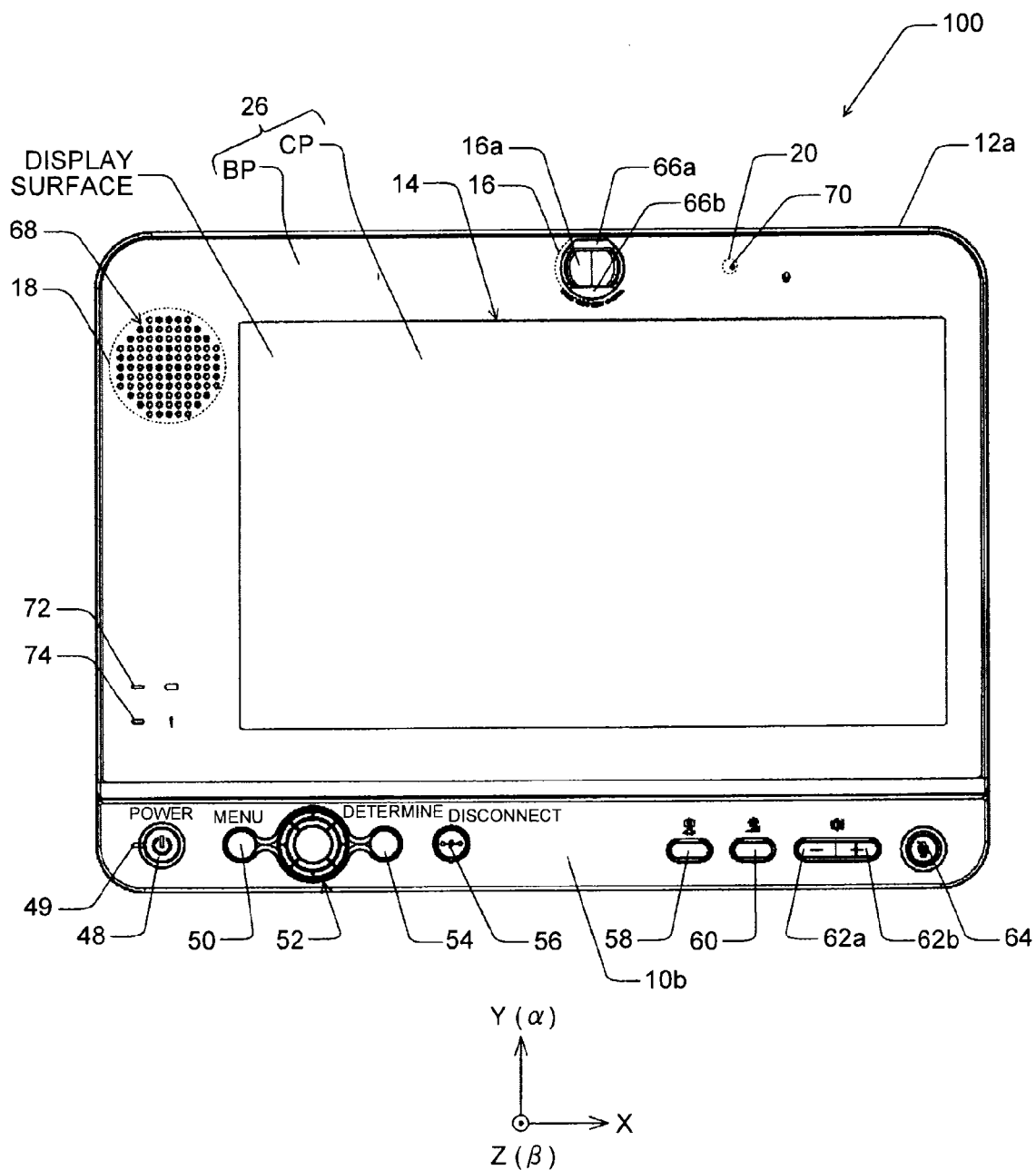
FIG. 3 is a top view of the teleconference device in the basic form.

FIG. 3 illustrates a state where the teleconference device 100 is placed in the basic form on a horizontal placement surface. In the following explanation, the longitudinal direction of the teleconference device 100 is an X-axis direction, the direction that is perpendicular to the X-axis direction on a horizontal plane is a Y-axis direction, and the direction (vertical direction) that is perpendicular to the X-axis direction and the Y-axis direction is a Z-axis direction. Furthermore, if not otherwise specified, it is assumed that the teleconference device 100 is in the basic form.

As illustrated in FIGS. 2 and 3, the teleconference device 100 includes a first chassis 10, a second chassis 12, a display 14, an electronic camera 16, a speaker 18, a microphone 20, a control device 24 (see FIG. 4), or the like.

For example, as illustrated in (A) and (B) of FIG. 2, the first chassis 10 includes a control-device housing section 10a that houses the control device 24 and includes an operation panel section 10b in which a plurality of operating members are provided.

The control device 24 performs an encoding operation or decoding operation on image data and sound data and controls transmission and reception of images and sounds via the Internet.

Figure 4:
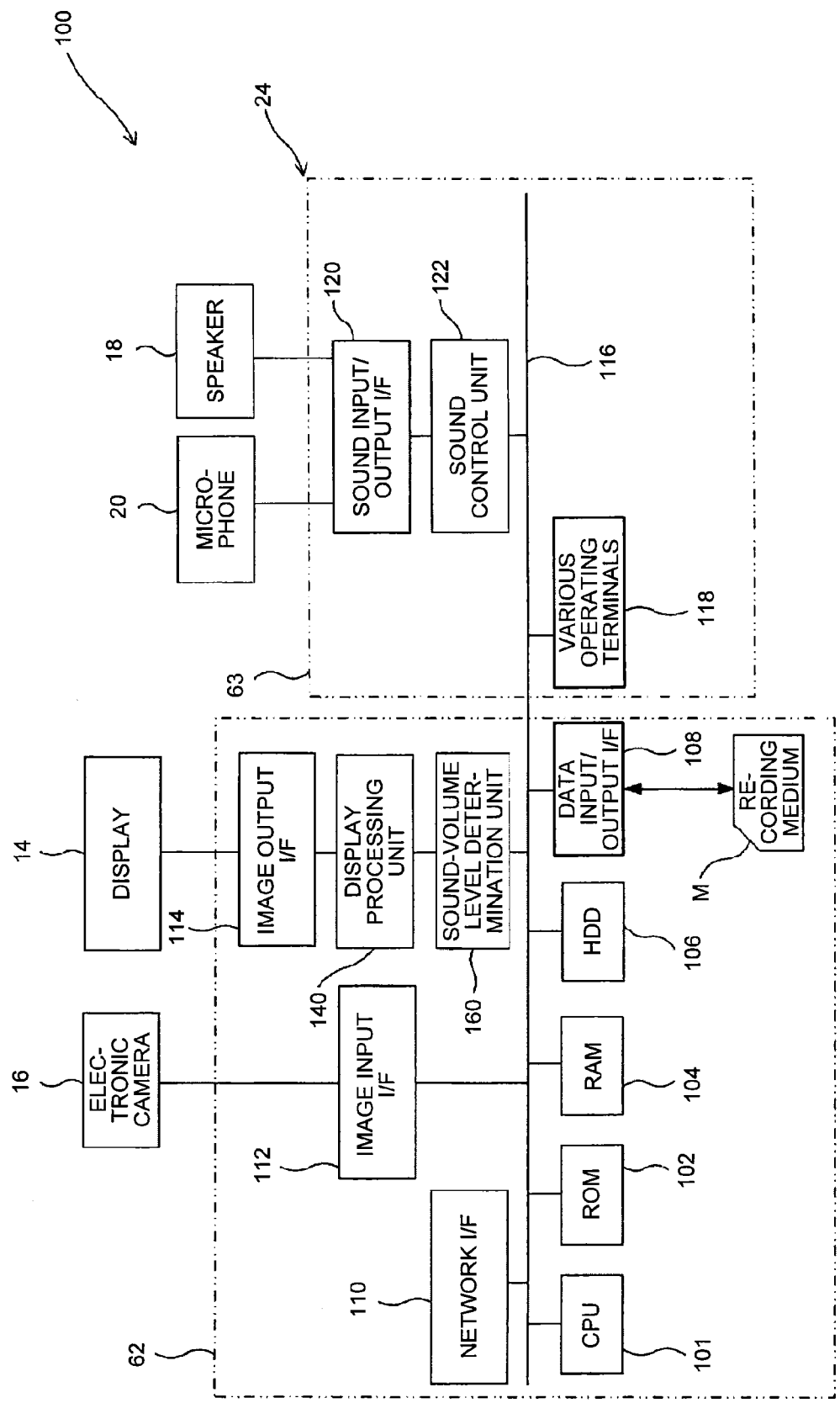
FIG. 4 is a block diagram that illustrates a configuration for control of the teleconference device.

As illustrated in FIG. 4, the control device 24 includes, for example, a main board 62 that is a board for control, and a sub-board 63 that is a board for sound processing and manipulation.

Various components are installed on the main board 62, for example, a central processing unit (CPU) 101, a read only memory (ROM) 102, a random access memory (RAM) 104, a hard disk drive (HDD) 106 (or a storage or recording device), a data input/output interface (I/F) 108, a network I/F 110, an image input I/F 112, a sound-volume level determination unit 160, a display processing unit 140, and an image output I/F 114. The CPU 101, the ROM 102, the RAM 104, the HDD 106, the data input/output I/F 108, the network I/F 110, the image input I/F 112, and the sound-volume level determination unit 160 are connected to one another via a bus line 116, such as an address bus or data bus, such that they can perform a two-way communication. Furthermore, the above-described image data is data on moving images or intermittent images (still images at a certain time interval).

The CPU 101 controls the overall operation of the teleconference device 100 in accordance with a predetermined program (teleconference-device program). An explanation is given below of a sequence of operations associated with a two-way communication of sounds and images via a network (for example, the Internet) in response to an instruction of the CPU 101 in accordance with the teleconference-device program.

The ROM 102 stores a program, such as an initial program loader (IPL), that is used for driving the CPU 101. The RAM 104 is used as a work area of the CPU 101.

The HDD 106 stores the above-described teleconference-device program and various types of data, such as image data and sound data. Not only the HDD 106 but also, for example, a solid state drive (SSD) may be used. The above-described teleconference-device program may be distributed by being stored in, for example, a storage medium that is readable by a computer in a format of a file that is installable or executable. Furthermore, the above-described teleconference-device program may be stored in the ROM 102 instead of the HDD 106. The HDD 106 controls reading or writing of various types of data from or to the HDD 106 under the control of the CPU 101.

The data input/output I/F 108 controls reading or writing (storing) of data from or to a storage medium M, such as a flash memory, that is connected to a plurality of USB terminals, which will be explained later, and controls transmission of data to a teleconference device at a different hub from, for example, a personal computer (PC) that is connected to a USB terminal.

The storage medium M is attachable to or removable from one USB terminal out of a plurality of USB terminals. Furthermore, if the storage medium M is, for example, an SD memory, CompactFlash (registered trademark), or the like, that is not directly attachable to or removable from a USB terminal, a configuration may be such that a memory read drive is attached to or removed from a USB terminal, or a memory read drive may be separately provided in the teleconference device 100 in advance. Moreover, not only a flash memory but also an electrically erasable and programmable ROM (EEPROM), or the like, may be used as the storage medium M as long as it is a non-volatile memory that reads or writes data under the control of the CPU 101.

The network I/F 110 includes a LAN terminal 38 (e.g., Ethernet (registered trademark) terminal), which will be explained later, so as to input and output (receive and transmit) data (image data and sound data) via the Internet. The network I/F 110 may be provided such that it is connectable to a wired LAN terminal, or it may be a wireless LAN network I/F that is connectable to a wireless LAN.

The image input I/F 112 receives, as predetermined image data, the image signal of an object that is output from the electronic camera 16, which will be explained later.

The sound-volume level determination unit 160 determines whether the sound volume level of the sound data that is received from a communication target (different hub) via the network I/F 110 is equal to or greater than a predetermined threshold and sends a determination result to the display processing unit 140.

As described in detail later, the display processing unit 140 uses the determination result of the sound-volume level determination unit 160 to set the size and the location of the image data that is received from a different hub via the network I/F 110 and that is to be displayed as an image on the display surface of the display 14, and sends the image data to the image output I/F 114. In the present embodiment, as described in detail later, a display unit including the display processing unit 140 and the CPU 101 displays an image received from a different hub where there is no speaker on the display surface of the display 14 in a reduced size (predetermined size) and displays an image received from a different hub where there is a speaker in an enlarged size that is larger than the reduced size.

The image output I/F 114 converts the image data received from the display processing unit 140 into an image signal that is displayable on the display 14 and outputs it to the display 14. As a result, the image corresponding to the image data is displayed on the display surface of the display 14.

Furthermore, the above-described image signal includes an analog RGB signal (VGA), component video signal, High-Definition Multimedia Interface (HDMI) (registered trademark) signal, or Digital Video Interactive (DVI) signal.

Various components are installed on the sub-board 63, for example, multiple operating terminals 118 that correspond to the above-described multiple operation buttons, a sound input/output I/F 120, and a sound control unit 122. The multiple operating terminals 118 and the sound control unit 122 are connected to one another via the bus line 116 such that they can perform a two-way communication, and they are connected to each of the above-described components that are installed on the main board 62 and are connected to one another via the bus line 116 such that they can perform a two-way communication.

The sound input/output I/F 120 receives, as predetermined sound data, the sound signal that is input from the microphone 20 so as to send the sound data to the sound control unit 122, and converts the sound data received from a different hub via the network I/F 110 and the sound control unit 122 into a sound signal that can be reproduced by the speaker 18.

The sound control unit 122 adjusts the volume of sound that is output from the speaker 18 in response to an operation on a pair of volume buttons 62*a*, 62*b*, which will be described later, and switches input/non-input of sound of the microphone 20 when a microphone mute button 64, which will be explained later, is pressed down (turned on/off).

Furthermore, the sound control unit 122 has an echo cancellation processing function to prevent echo and howling that occur when sound is output from the speaker 18 and is input to the microphone 20 during a two-way communication with the teleconference device 100 at a different hub and a sound wave loop is formed with the teleconference device 100 at the different hub, and it also has a noise cancellation processing function to reduce noise, such as the operating noise of an indoor air conditioner, that is input through the microphone 20.

Figure 5:
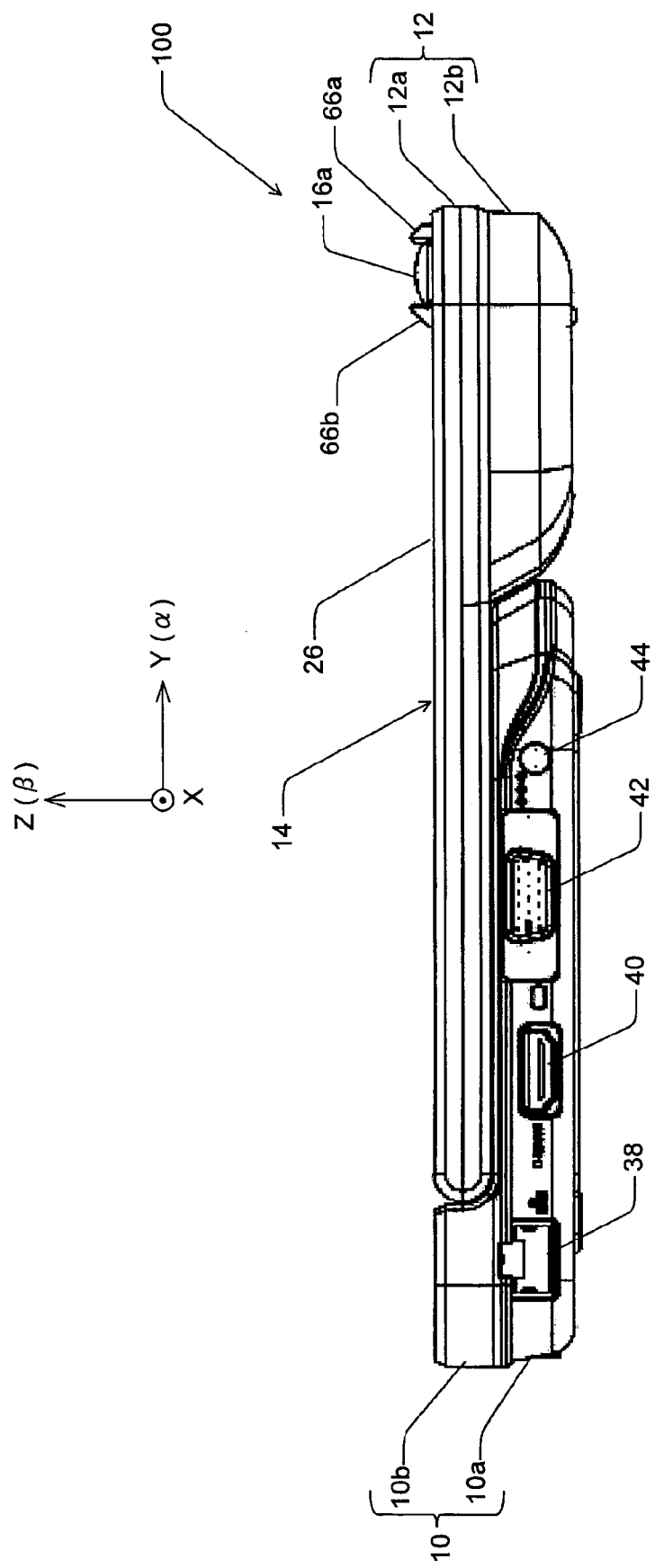
FIG. 5 is a side view of the teleconference device in the basic form.
Figure 6:
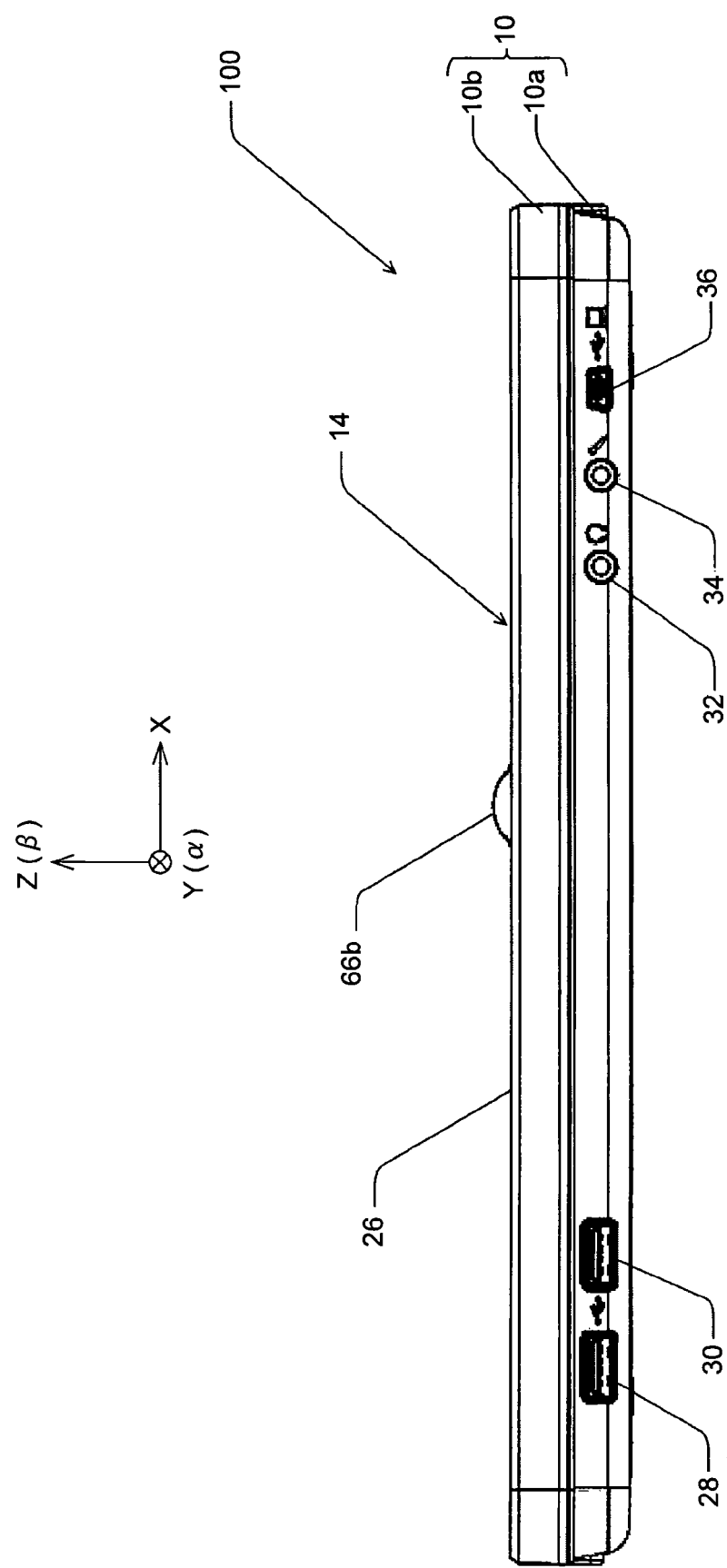
FIG. 6 is another side view of the teleconference device in the basic form.

As it can be seen from the combination of FIG. 5 and FIG. 6, for example, the control-device housing section 10*a* is formed of a box section that has a shape like substantially a rectangular flat plate, the longitudinal direction of which is in the X-axis direction.

Furthermore, as illustrated in FIG. 5, four openings are formed on the side wall of the control-device housing section 10*a* on the +X side, and the communication LAN terminal 38, an HDMI (registered trademark) image output terminal 40, a VGA image output terminal 42, and a power terminal (power jack) 44, which are installed on the main board 62, are engaged with the four openings. In addition to or instead of the image output terminals 40, 42, it is possible to provide a DVI-I terminal, component terminal, D terminal, S terminal, or composite terminal.

As illustrated in FIG. 6, for example, two openings are formed on the −X-side end section of the side wall of the control-device housing section 10*a* on the −Y side, and USB terminals 28, 30, which are installed on the main board 62, are engaged with the two openings. Furthermore, for example, three openings are formed on the +X-side end section of the side wall of the control-device housing section 10*a* on the −Y side, and a headphone-connection terminal 32, a microphone-connection terminal 34, and a USB terminal 36, which are installed on the main board 62, are engaged with the three openings.

Figure 7:
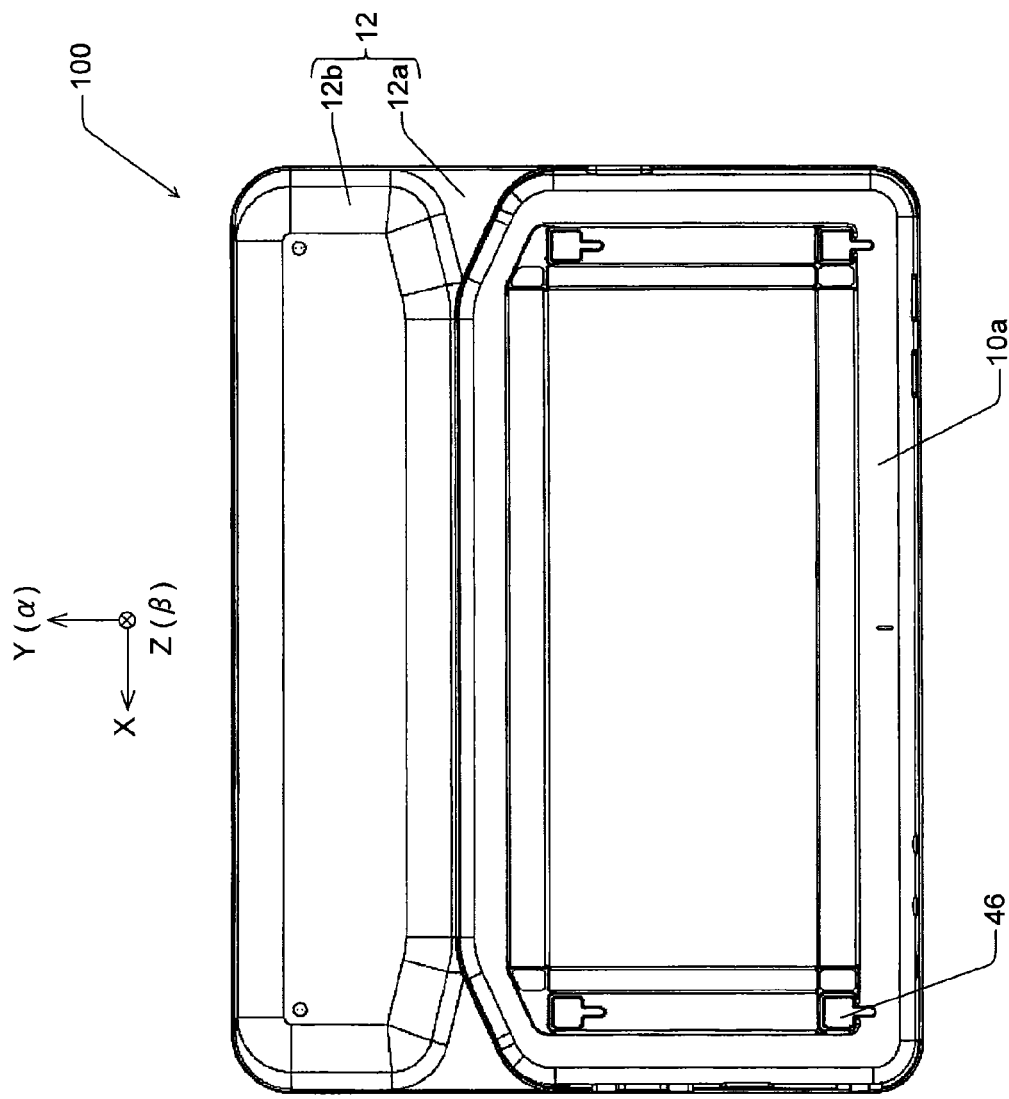
FIG. 7 is a bottom view of the teleconference device in the basic state.

Furthermore, as illustrated in FIG. 7, for example, four openings are formed on the four corners of the wall (bottom wall) of the control-device housing section 10a on the −Z side, and four connectors 46 are engaged with the four openings, the four connectors being installed on the main board 62 so as to connect an externally connected battery.

As can be seen from the combination of FIGS. 3, 5, and 6, the operation panel section 10b is formed of a box section that has an elongated shape like substantially a rectangular flat plate, the longitudinal direction thereof is in the X-axis direction, and it is connected to the +Z-side edge of the −Y-side end section of the control-device housing section 10a.

As illustrated in FIG. 3, for example, five openings are formed on the −X-side area of the wall of the operation panel section 10b on the +Z side and are arranged side by side in the X-axis direction, and five operating members are individually engaged with the five openings. For example, sequentially from the −X side to the +X side, the five operating members are a power button 48, a menu button 50, a cursor 52, a determination button 54, and a disconnection button 56 for disconnecting the Internet connection with a communication target.

The power button 48 is an operating member for turning on/off the power for the teleconference device 100. A power lamp 49 is provided near the power button 48 of the operation panel section 10b, and it lights when the power is on.

The menu button 50 is an operating member for invoking a menu screen on the display 14.

The cursor 52 is an operating member for selecting an item that is displayed on the menu screen that is presented on the display 14. Specifically, the cursor 52 is operated so that an item can be selected from the menu screen.

The determination button 54 is an operating member for determining an item that is selected from the menu screen. Items that are selected and determined within the menu screen include, for example, the address of the teleconference device 100 at a different hub, or the like.

The disconnection button 56 is an operating member for disconnecting the Internet connection with the teleconference device 100 that is a communication target.

For example, five openings are formed on the +X-side area of the wall of the operation panel section 10b on the +Z side and are arranged side by side in the X-axis direction, and five operating members are individually engaged with the five openings. For example, sequentially from the −X side to the +X side, the five operating members are a view switch button 58, a brightness adjustment button 60, the pair of volume buttons 62a, 62b, and the microphone mute button 64.

The view switch button 58 is an operating member for switching the image to be transmitted to a different hub among the images taken by the electronic camera 16. Specifically, if there are multiple users (conference participants) at a certain hub, for example, the view switch button 58 is pressed so that it is possible to transmit, to a different hub, any of multiple images that selectively display at least one of users.

The brightness adjustment button 60 is an operating member for adjusting the brightness of an image that is presented on the display 14. The brightness adjustment button 60 is pressed as appropriate in accordance with the brightness around the teleconference device 100 so that the brightness of the screen of the display 14 can be adjusted to an appropriate brightness for desired visibility. Here, the brightness that is adjusted by the brightness adjustment button 60 is set in N (N is a natural number) stages, for example, and each time the brightness adjustment button 60 is pressed, the brightness is increased or decreased in stages and, when the brightness adjustment button 60 is pressed N times, it is returned to the original brightness.

The pair of volume buttons 62a, 62b is the operating member for adjusting the volume of sound that is output from the speaker 18. Out of the pair of volume buttons 62a, 62b, the volume button 62a on the −X side is pressed so that the above-described volume of sound can be decreased, and the volume button 62b on the +X side is pressed so that the above-described volume of sound can be increased.

The microphone mute button 64 is the operating member for switching on/off the microphone 20. When the microphone 20 is on, it means a state where sounds are input through the microphone 20 and, when the microphone 20 is off, it means a state where sounds are not input through the microphone 20.

As illustrated in (A) and (B) of FIG. 2, the second chassis 12 includes a first housing section 12a and a second housing section 12b, the first housing section 12a houses the display 14, part of the electronic camera 16, part of the speaker 18, and part of the microphone 20, and the second housing section 12b houses the remaining part of the electronic camera 16 (except for an imaging lens 16a), the remaining part of the speaker 18, and the remaining part of the microphone 20.

As can be seen from the combination of FIGS. 3, 5, and 6, the first housing section 12a is formed of a box section that has a shape like substantially a rectangular flat plate, the longitudinal direction thereof is in the X-axis direction, and it is located on the +Z side of the control-device housing section 10a and on the +Y side of the operation panel section 10b. Here, when the teleconference device 100 is in the basic form, for example, the surface of the first housing section 12a on the −Z side abuts the surface of the control-device housing section 10a on the +Z side.

The display 14 is housed in substantially the center of the first housing section 12a in a state where the display 14 is parallel to the XY plane.

For example, the display 14 includes a liquid crystal structure that includes a liquid crystal panel that has the display surface that displays images; two electrodes that are located in positions with the liquid crystal panel interposed therebetween; and two polarization plates that are located in positions with the two electrodes interposed therebetween and includes a backlight that is provided on one side of the liquid crystal structure, and it has an overall shape like a flat plate. Specifically, the display 14 is what is called a liquid crystal display.

For example, a large rectangular opening is formed on the surface of the first housing section 12a on the +Z side, the rectangular opening is larger than the display 14 more than slightly, and a cover panel 26 made of reinforced plastic is fitted into the rectangular opening. Specifically, the +Z side of the display 14 is covered with the cover panel 26. The area of the cover panel 26 that corresponds to (is opposed to) the display 14 is transparent, and the area around the above area is black, for example. In the following, the transparent area of the cover panel 26 is referred to as a clear panel section CP, and the black area of the cover panel 26 is referred to as a black panel section BP. In this case, the liquid crystal panel of the display 14 is viewable from the +Z side thereof via the clear panel section CP.

As can be seen from the combination of FIGS. 5 and 6, the second housing section 12b is formed of a box section like substantially a rectangular flat plate, the longitudinal direction thereof is in the X-axis direction, and it is connected to the −Z-side edge of the +Y-side end section of the first housing section 12a. Specifically, the second housing section 12b protrudes toward the −Z side from the −Z-side edge of the first housing section 12a.

As can be seen from the combination of FIGS. 3, 5, and 6, the part of the electronic camera 16 excluding the imaging lens 16a is housed in the middle section, with respect to the X-axis direction, of the space that is formed by the +Y-side end section of the first housing section 12a and the second housing section 12b, and the imaging lens 16a protrudes outward from the second chassis 12 through the opening that is formed on the black panel section BP.

For example, a wide-angle lens is used as the imaging lens 16a, which has substantially a semispherical shape and that has a field of view of 170° in the X-axis direction and a field of view of 135° in the Y-axis direction.

As illustrated in FIGS. 3, 5, and 6, a pair of lens-protection protrusions 66a, 66b is formed and protruded in the vicinity of the +Y side and the −Y side of the imaging lens 16a in the black panel section BP in order to protect the imaging lens 16a. The outer surface of each of the lens-protection protrusions is formed of a curved surface; therefore, even if hands and fingers, or the like, are brought into contact with it, physical damages are prevented.

The electronic camera 16 captures an image of an object (for example, a user, or writings and paintings) via the imaging lens 16a, converts the captured image into an image signal (electric signal), and outputs it to the image input I/F 112 (see FIG. 4). For example, a CCD, CMOS, or the like, is used as an imaging element of the electronic camera 16.

Furthermore, as illustrated in FIG. 3, the speaker 18 is provided on the −X-side end section of the space that is formed by the +Y-side end section of the first housing section 12a and the second housing section 12b such that the sound output direction thereof is substantially in the +Z direction.

Here, for example, a full-range type round speaker is used as the speaker 18; however, it may be other speakers. The speaker 18 is connected to the sound input/output I/F 120, and it outputs, as a sound, the sound signal that is sent from the sound input/output I/F 120 (see FIG. 4).

A sound emission opening 68 is formed on the area of the black panel section BP that corresponds to the speaker 18 so as to emit to outside the sound that is output from the speaker 18, and the sound emission opening 68 includes a plurality of small through-holes (see FIG. 3).

Furthermore, the microphone 20 is provided on the +X-side area of the electronic camera 16 in the space that is formed by the +Y-side end section of the first housing section 12a and the second housing section 12b such that the sound input direction thereof is substantially in the −Z direction.

Here, for example, a small-sized non-directional microphone is used as the microphone 20; however, a directional microphone may be used. The microphone 20 is connected to the sound input/output I/F 120, and it sends an input sound as a sound signal to the sound input/output I/F 120 (see FIG. 4).

A sound capturing opening 70 is formed on the area of the black panel section BP that corresponds to the microphone 20 so as to capture the sound that is input through the microphone 20, and the sound capturing opening 70 includes at least one small through-hole.

Furthermore, a remaining-amount lamp 72 and a connection lamp 74 are provided on the corner section of the black panel section BP on the −X side and the −Y side, the remaining-amount lamp 72 indicates the remaining amount of change of the externally connected battery, and the connection lamp 74 indicates the connection status of the Internet connection.

Figure 8:
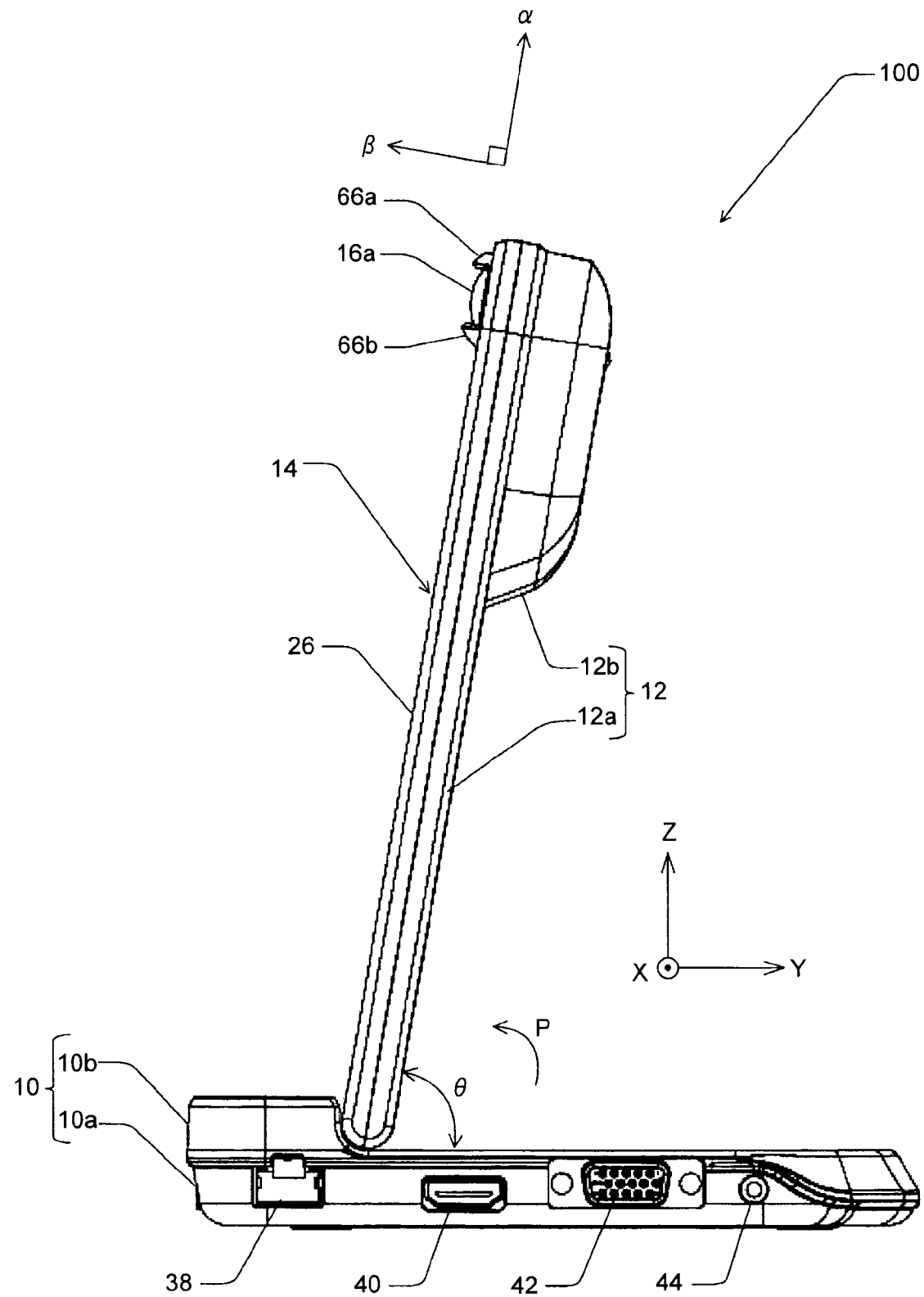
FIG. 8 is a side view of the teleconference device in the open form.

In the following explanation, as illustrated in FIG. 8, the axis that is perpendicular to the X axis and is parallel to the cover panel 26 is referred to as the α axis, and the axis that is perpendicular to the X axis and the α axis is referred to as the β axis. When the teleconference device 100 is in the basic form, the α axis corresponds to the Y axis, and the β axis corresponds to the Z axis.

Here, the −Y-side end section of the first housing section 12a, i.e., the −α-side end section thereof is connected to the first chassis 10 via a torque hinge (not illustrated) whose axial direction is in the X-axis direction. Furthermore, the liquid crystal panel of the display 14 is visible from the +β side, the imaging lens 16a is exposed to the +β side, the sound output direction of the speaker 18 is substantially on the +β side, and the sound input direction of the microphone is substantially on the −β side.

Specifically, due to the action of the above-described torque hinge, the second chassis 12 is relatively rotatable around the X axis between the abutting position (see FIGS. 5 and 6) where it abuts the first chassis 10 and the separation position (see FIG. 8) where it is separated from the first chassis 10. Thus, hereafter, the form of the teleconference device 100 when the second chassis 12 is in the separation position is also referred to as the open form.

Figure 9:
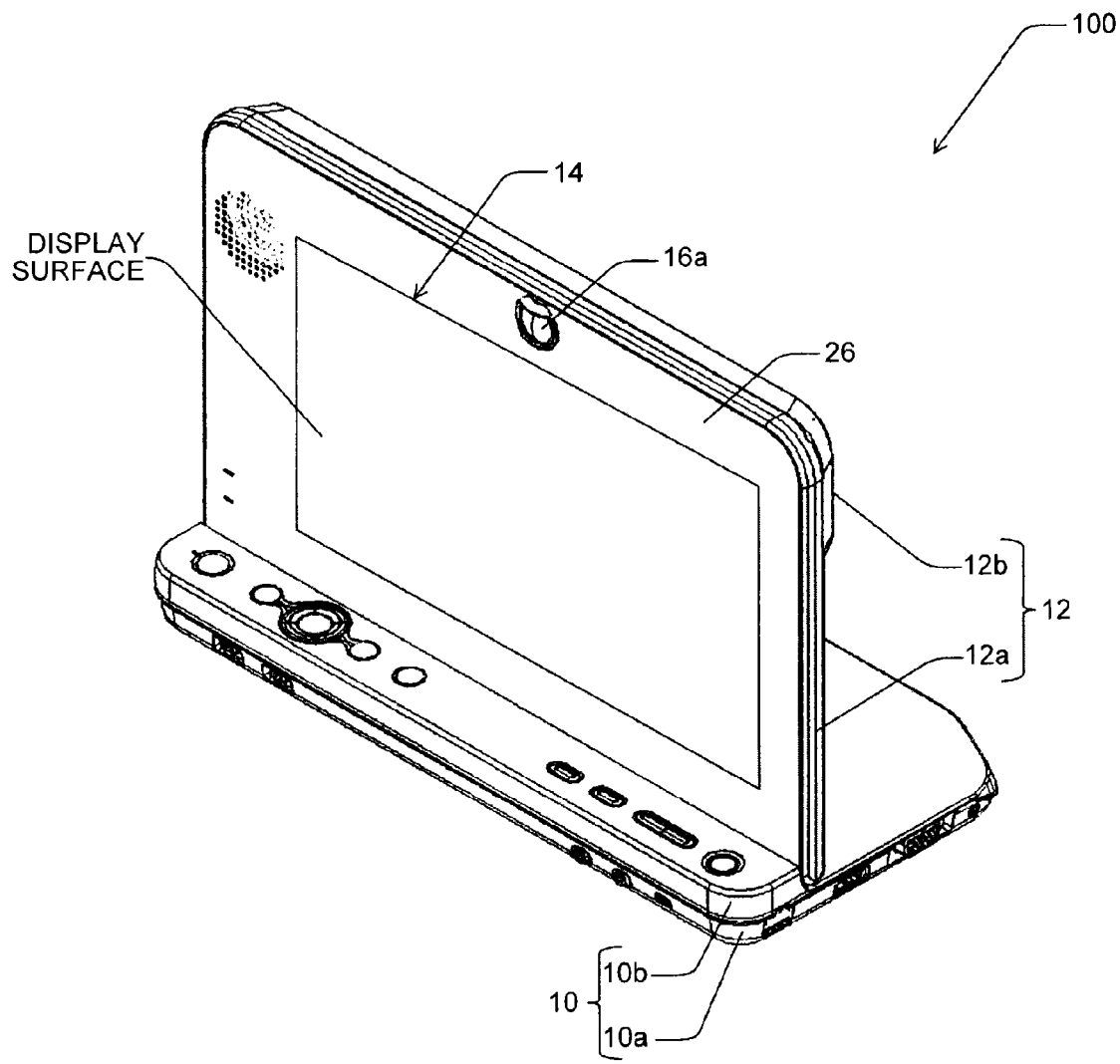
FIG. 9 is a perspective view of the teleconference device in the maximum open form.

The rotation angle θ of the second chassis 12 relative to the first chassis 10 around the X axis is set to, for example, 0°≤θ≤90° if θ=0° when the teleconference device 100 is in the basic form, i.e., when the second chassis 12 is in the abutting position. In FIG. 9, θ=90°, and the teleconference device 100 is in the maximum open form. Moreover, because of the action of the above-described torque hinge, the second chassis 12 can be held at the position with the rotation angle θ relative to the first chassis 10 around the X axis. When the second chassis 12 is in the abutting position, the form of the teleconference device 100 is the basic form. Therefore, the basic form is also referred to as the closed form below.

An explanation is given below of an example of the teleconference that uses the conference system 1000 that is configured as described above. Here, the teleconference is held among, for example, ten hubs by using the teleconference device 100 that is provided at each of the hubs (see FIG. 1). The number of users (conference participants) at each hub is one, for example.

As illustrated in FIG. 10, a user at each hub takes a seat on the −Y side of a table T that is provided in a room, for example, in a state where he/she faces the side of the table T.

The user places the teleconference device 100, for example, in the basic form on the top surface of the table T such that the operation panel section 10b is located on the front side (−Y side) and rotates the second chassis 12 relative to the first chassis 10 around the X axis at the angle φ (e.g., 60°≤φ≤90°). As a result, the display 14 is set in a state where it rises from the first chassis 10 as a base and faces substantially the −Y side, i.e., a state where the display surface is viewable from the −Y side thereof. Furthermore, in this state, the imaging lens 16a, the speaker 18, and the microphone 20 are located on substantially the same level as that of the face of the user who is taking a seat. Moreover, in this state, the imaging lens 16a faces substantially the −Y side, the sound output direction of the speaker 18 is substantially on the −Y side, and the sound input direction of the microphone is substantially on the +Y side.

Furthermore, when the user places the teleconference device 100 on the table T, the user also establishes wiring connections (for example, the connection between the LAN terminal 38 and the terminal to be connected to the Internet, the connection between the power terminal 44 and an external power, or the like) related to electricity and communication for the teleconference device 100.

Next, the user presses the power button 48 so as to start up the teleconference device 100. At this time, the display 14 presents the menu screen. The menu screen displays various items for various adjustments, the start of a conference (the start of a two-way communication), or the like, by using icons and textual information. The user then operates the cursor 52 to select the item related to the start of a conference from the above-described menu screen and presses the determination button 54 to determine the start of a conference.

When the start of a conference is determined, the menu screen on the display 14 of the teleconference device 100 at an arbitrary hub presents the address list of the other nine hubs, and a user at the hub operates the cursor 52 so as to select, from the above-described address list, a different hub with which it desires to have a teleconference (two-way communication) and determine it by pressing the determination button 54. Here, the other nine hubs are selected and determined. As a result, the teleconference device 100 at the hub transmits a request for a two-way communication to the teleconference devices 100 at the other nine hubs.

When the teleconference device 100 at each of the other hubs receives the request for a two-way communication, it displays the items related to acceptation and rejection of the request on the menu screen that is presented on the display 14.

Then, the user at each of the other hubs operates the cursor 52 and the determination button 54 of the teleconference device 100 at the hub so as to select and determine any of the above-described items related to acceptation and rejection. Here, the item related to acceptation is selected and determined and, accordingly, the ten teleconference devices 100 are connected to one another via the Internet such that they can perform a two-way communication.

When a two-way communication is started among the ten teleconference devices 100, the user's image that is taken by the electronic camera 16 of the teleconference device 100 at an arbitrary hub is transmitted to the teleconference devices 100 at the other nine hubs via the Internet and is presented on the displays 14 of the teleconference devices 100.

Moreover, the user's voice that is captured by the microphone 20 of the teleconference device 100 at an arbitrary hub is transmitted to the teleconference devices 100 at the other nine hubs via the Internet and is output from the speakers 18 of the teleconference devices 100.

Thus, a teleconference is held among the ten hubs through a two-way communication of images and sounds.

Furthermore, teleconference devices usually need to display the images received from multiple different hubs on the screen of a display device (for example, a monitor) such that they can be viewed simultaneously and, as the number of hubs is increased, it is necessary to reduce the size of the image that is received from each of the different hubs and that is to be displayed on the screen of the monitor. In this case, it is difficult to view the images, and it is not always easy to determine a different hub where there is a speaker by using only sounds; therefore, there is a need to make it easy to view the images. Furthermore, if there is a speaker at each of the multiple different hubs, i.e., if the multiple different hubs are in a state for communications, there is a need to make it easy to see which different hubs are in a state for communications. Furthermore, if image recording/sound recording is made on a teleconference as the conference records by using a medium and if, for example, a person who has not attended the teleconference, or the like, reproduces and views it from the medium, there is a need to make it easy to recognize the hub where there is a speaker in order to easily determine the atmosphere of the place.

Figure 11:
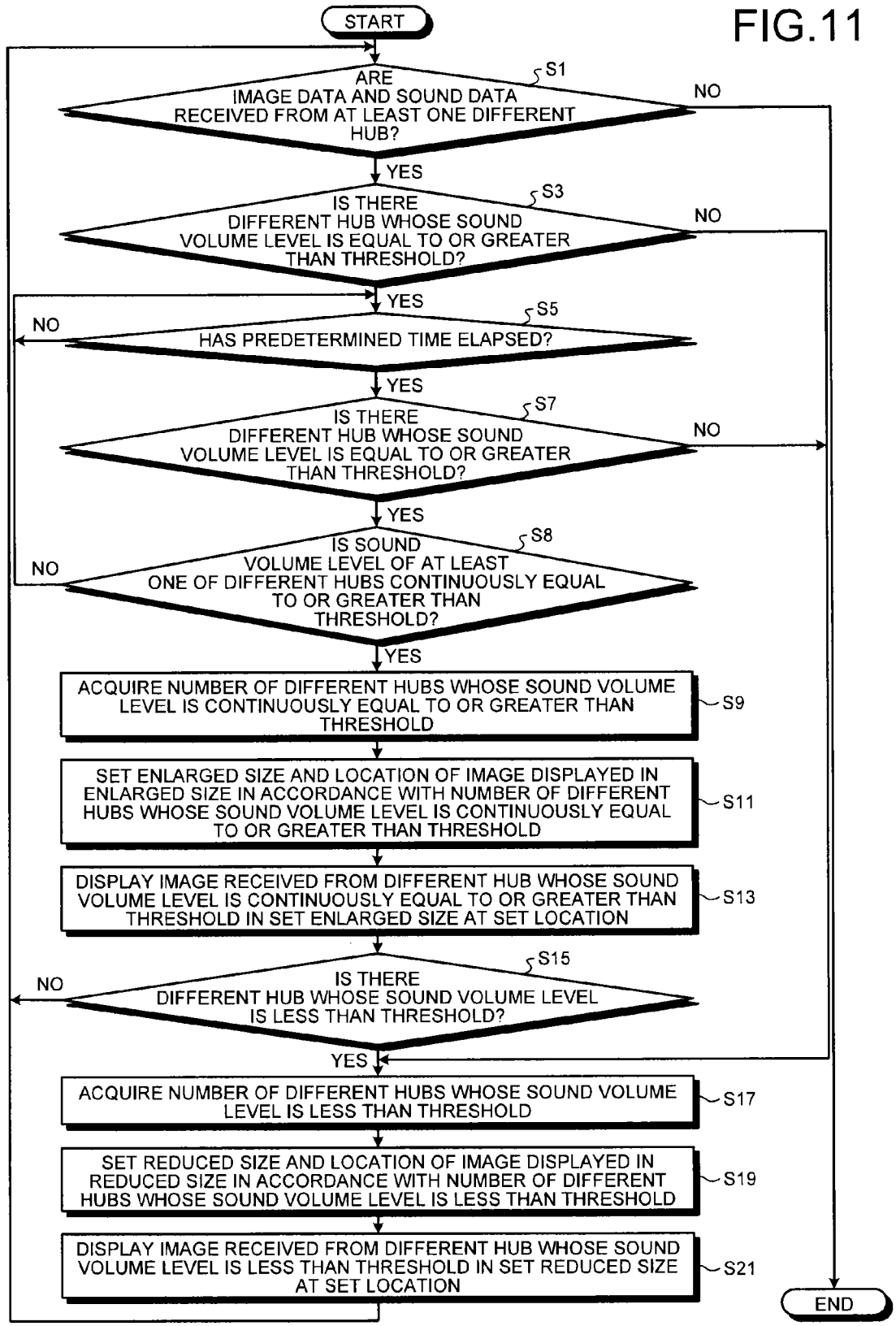
FIG. 11 is a flowchart that illustrates a sequence of operations that are performed to present the image received from a different hub on the display of the teleconference device.

Therefore, the teleconference device 100 performs a control (a sequence of operations) illustrated in FIG. 11. The flowchart of FIG. 11 corresponds to a processing algorithm of the CPU 101. A detailed explanation is given below of this control.

At the first Step S1, it is determined whether image data and sound data are received from at least one different hub. If the network I/F 110 receives image data and sound data from at least one different hub, a positive determination is made at Step S1, and the process proceeds to Step S3. Conversely, if the network I/F 110 does not receive image data or sound data from a different hub, a negative determination is made at Step S1, and the flow is terminated. The CPU 101 always monitors the reception status of image data and sound data in the network I/F 110.

At Step S3, in accordance with a determination result of the sound-volume level determination unit 160, it is determined whether there is a different hub whose sound volume level is equal to or greater than a predetermined threshold, i.e., whether the sound volume level of the sound data received from at least one different hub is equal to or greater than the threshold. This threshold is a value that is an index (reference) for determining whether there is a speaker at each hub. When a positive determination is made at Step S3, the process proceeds to Step S5. Conversely, when a negative determination is made at Step S3, the process proceeds to Step S17.

At Step S5, it is determined whether a predetermined time (for example, several seconds to several tens of seconds) has elapsed. When a positive determination is made at Step S5, the process proceeds to Step S7. Conversely, when a negative determination is made at Step S5, the same determination is repeated. The time measurement here is conducted by using, for example, a timer that is included in the control device 24.

At Step S7, in accordance with a determination result of the sound-volume level determination unit 160, it is determined whether there is a different hub whose sound volume level is equal to or greater than the above-described threshold, i.e., whether the sound volume level of the sound data received from at least one different hub is equal to or greater than the threshold. When a positive determination is made at Step S7, the process proceeds to Step S8. Conversely, when a negative determination is made at Step S7, the process proceeds to Step S17.

At Step S8, it is determined whether, out of the different hubs whose sound volume levels are equal to or greater than the above-described threshold during the determination at Step S7, the sound volume level of at least one different hub is continuously equal to or greater than the threshold for the above-described predetermined time, i.e., it is determined whether the sound volume level of a different hub, the sound volume level of which is equal to or greater than the threshold during the determination at Step S7, is equal to or greater than the threshold during the determination at Step S3. When a positive determination is made at Step S8, the process proceeds to Step S9. Conversely, when a negative determination is made at Step S8, the process returns to Step S5.

As it is assumed that there is a speaker at a different hub whose sound volume level is continuously equal to or greater than the above-described threshold for the above-described predetermined time, the different hub is also referred to as the "different hub where there is a speaker" below. In this case, it means that a very short sound due to, for example, nodding, coughing, or sneezing, does not correspond to a speech even though the sound volume level thereof is equal to or greater than the threshold. In actuality, it is supposed that the sound volume level becomes less than the above-described threshold in the middle of a speech (during the above-described predetermined time); however, if the sound volume level is equal to or greater than the threshold during the determinations at Step S3 and Step S7, it is reasonable to assume that the sound volume level is continuously equal to or greater than the above-described threshold for the above-described predetermined time, i.e., to assume that a speech continues for the above-described predetermined time.

At Step S9, the number of different hubs (different hubs where there is a speaker) whose sound volume level is continuously equal to or greater than the above-described threshold for the above-described predetermined time is acquired.

At the next Step S11, in accordance with the number of different hubs whose sound volume level is continuously equal to or greater than the above-described threshold for the above-described predetermined time, an enlarged size and the location of the image to be displayed in the enlarged size are set.

Figure 12:
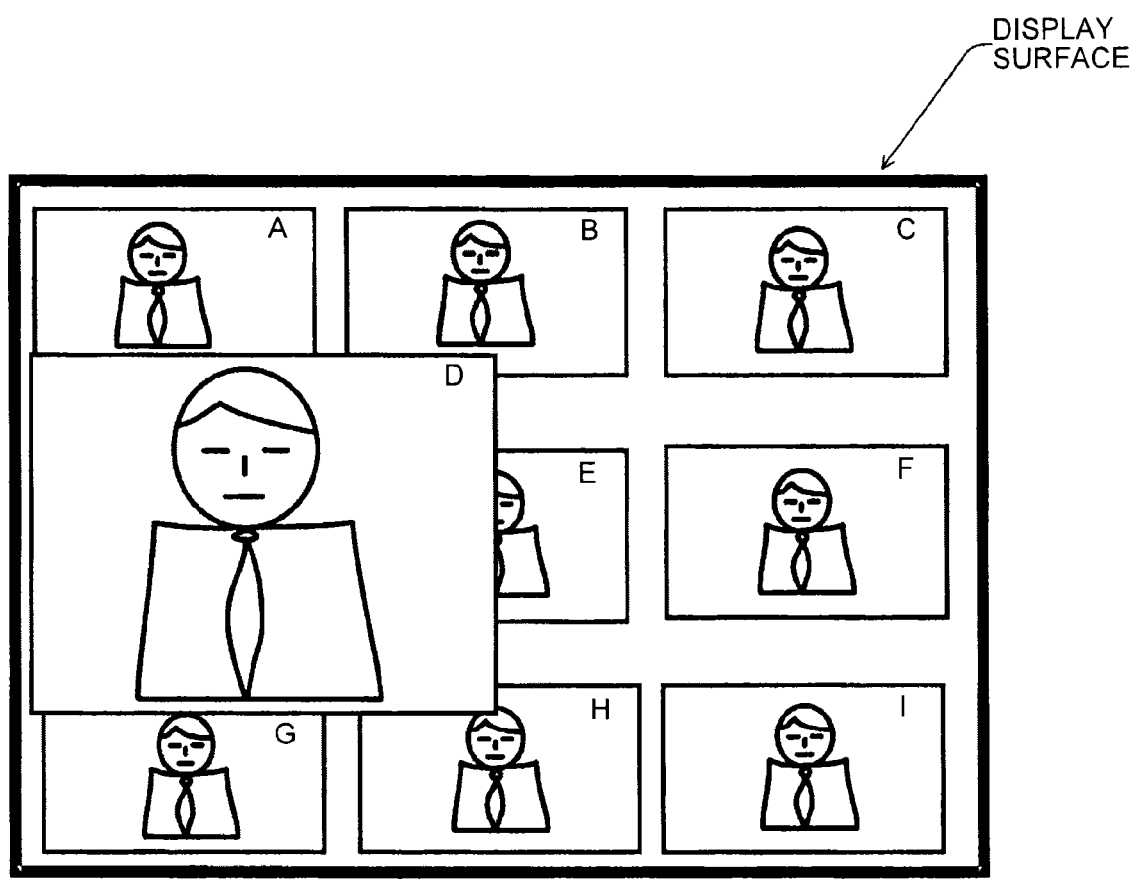
FIG. 12 is a diagram that illustrates a state where the image received from a single different hub is presented on the display of the teleconference device in an enlarged size and the images received from the rest of the different hubs are presented in a reduced size.

For example, as illustrated in FIG. 12, if the number of different hubs where there is a speaker is one out of the nine different hubs, the enlarged size is set to a size such that the entire image received from one different hub (for example, a different hub D) is displayable on the display surface, and the location of the image displayed in the enlarged size is set to an arbitrary location (for example, the left-side section of the display surface).

Figure 13:
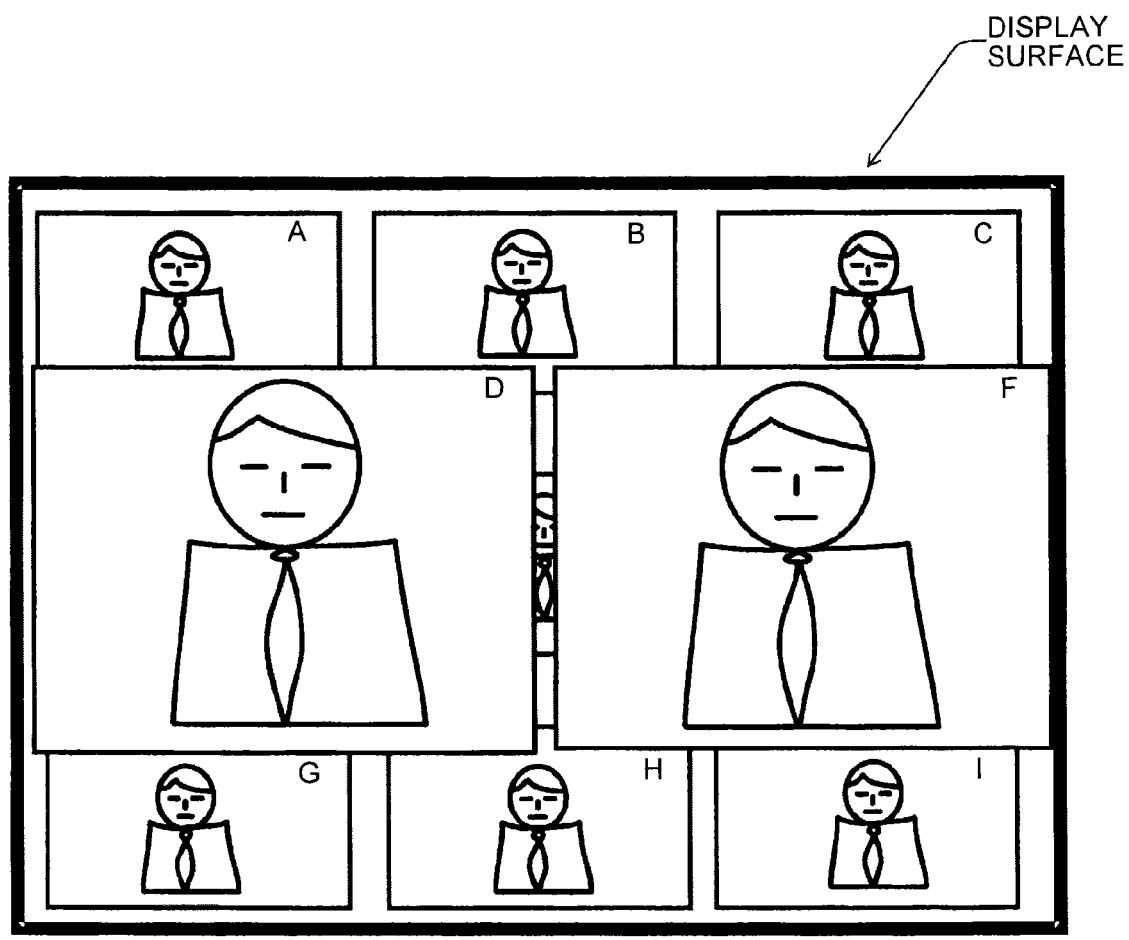
FIG. 13 is a diagram that illustrates a state where the images received from two different hubs are presented on the display of the teleconference device in an enlarged size and the images received from the rest of the different hubs are presented in a reduced size.

Furthermore, for example, as illustrated in FIG. 13, if the number of different hubs where there is a speaker is two out of the nine different hubs, the enlarged size and the locations of the images displayed in the enlarged size are set such that the entire images received from the two different hubs (for example, different hubs D and F) are collectively displayed at different locations (for example, the left-side section and the right-side section of the display surface) in the same size, for example.

Figure 14:
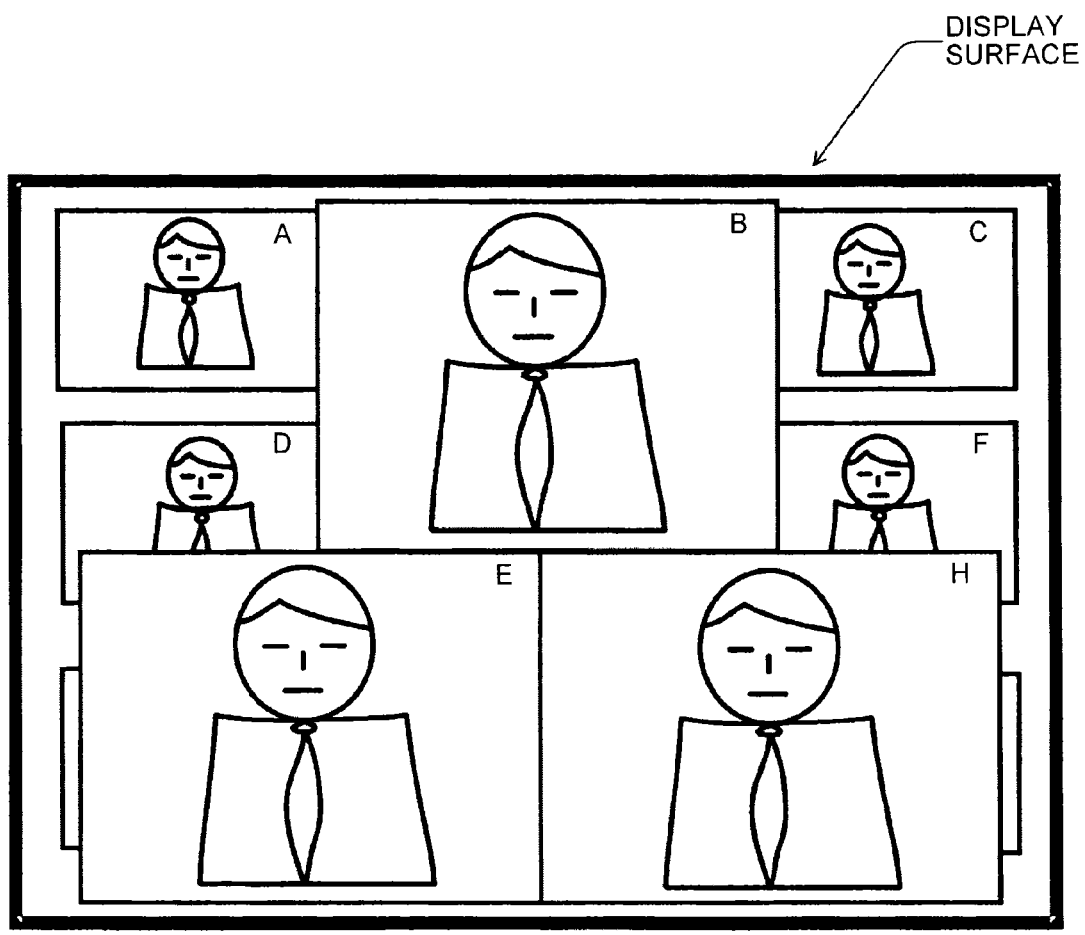
FIG. 14 is a diagram that illustrates a state where the images received from three different hubs are presented on the display of the teleconference device in an enlarged size and the images received from the rest of the different hubs are presented in a reduced size.

Furthermore, for example, as illustrated in FIG. 14, if the number of different hubs where there is a speaker is three out of the nine different hubs, the enlarged size and the locations of the images displayed in the enlarged size are set such that the entire images received from the three different hubs (for example, different hubs B, E and H) are collectively displayed at different locations (for example, the upper section, the lower-left section, and the lower-right section) in the same size, for example.

At the next Step S13, an image received from a different hub whose sound volume level is continuously equal to or greater than the above-described threshold is displayed at the set location in the set enlarged size (see FIGS. 12 to 14).

At the next Step S15, in accordance with a determination result of the sound-volume level determination unit 160, it is determined whether there is a different hub whose sound volume level is less than the above-described threshold during the determination at Step S7, i.e., whether the sound volume level of the sound data received from at least one different hub is less than the threshold during the determination at Step S7. It is assumed that there is no speaker at a different hub whose sound volume level is less than the above-described threshold during the determination at Step S7; therefore, the different hub is also referred to as a "different hub where there is no speaker" below. The sound-volume level determination unit 160 and the CPU 101 constitute a determination unit that determines whether there is a speaker at a different hub. When a positive determination is made at Step S15, the process proceeds to Step S17. Conversely, when a negative determination is made at Step S15, the process returns to Step S1. Specifically, a different hub where there is a speaker, the number of such different hubs, a different hub where there is no speaker, and the number of such different hubs are detected on an as-needed basis and, in accordance with a detection result, a different hub where there is a speaker is displayed in an enlarged size on the display surface of the display 14, and a different hub where there is no speaker is displayed in a reduced size. Thus, at the hub of interest (a single hub), the size of the image displayed on the display surface is switched between the enlarged size and the reduced size depending on whether there is a speaker.

At Step S17, the number of different hubs whose sound volume level is less than the above-described threshold is acquired.

At the next Step S19, in accordance with the number of different hubs whose sound volume level is less than the above-described threshold, the reduced size and the location of an image to be displayed in the reduced size are set.

Figure 15:
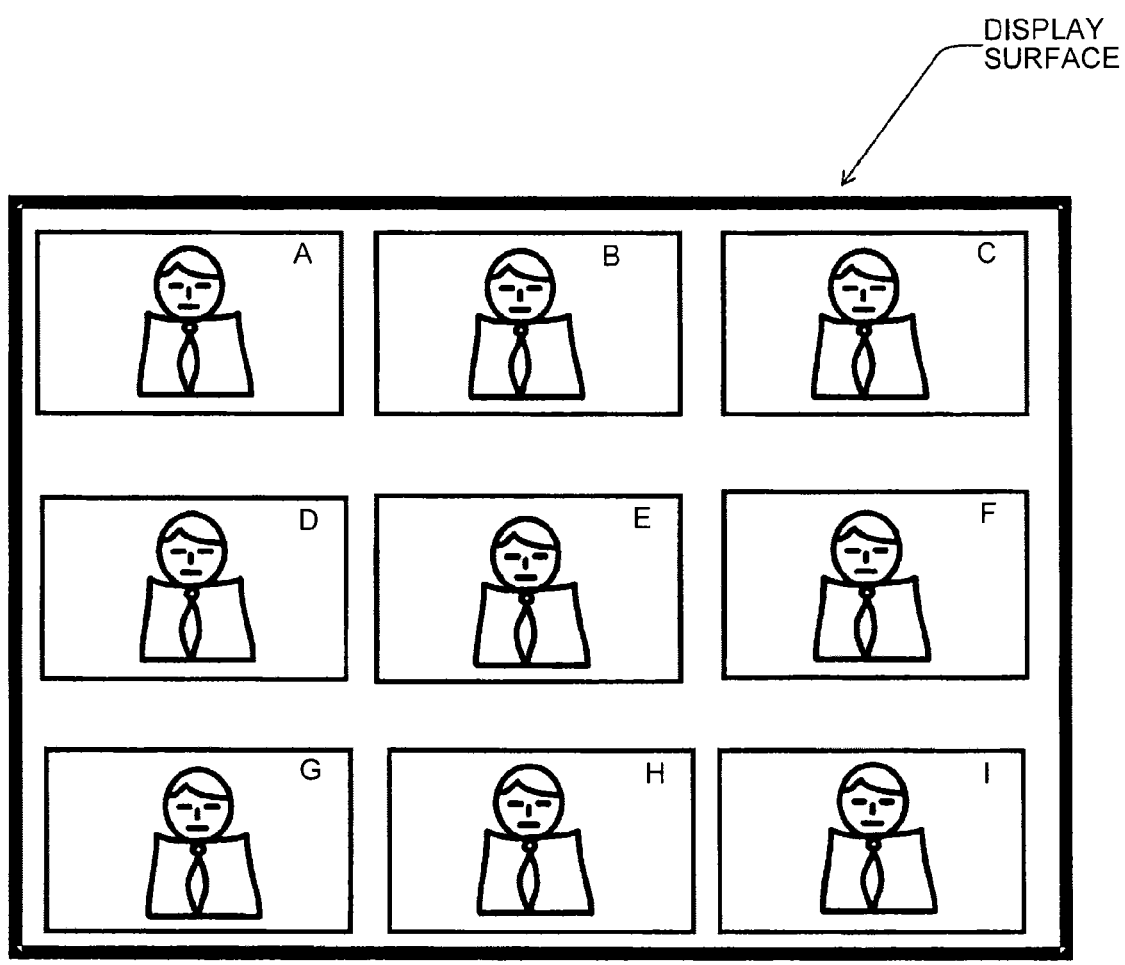
FIG. 15 is a diagram that illustrates a state where the images received from all (nine) of different hubs are presented on the display of the teleconference device in a reduced size.

For example, as illustrated in FIG. 15, if the number of different hubs where there is no speaker is nine out of the nine different hubs, the reduced size and the location of an image to be displayed in the reduced size are set such that the nine images received from the nine different hubs (for example, different hubs A to I) are located in different locations of the display surface. In FIG. 15, for example, the nine images received from the nine different hubs are arranged on the display surface in a matrix of 3×3.

Furthermore, for example, as illustrated in FIG. 12, if the number of different hubs where there is no speaker is eight out of the nine different hubs, the reduced size and the location of an image to be displayed in the reduced size are set such that the eight images received from the eight different hubs (for example, different hubs A, B, C, E, F, G, H, and I) are located in different locations of the display surface. In FIG. 12, part of the images received from the different hubs A, E, and G hide behind the image received from the different hub D.

Furthermore, for example, as illustrated in FIG. 13, if the number of different hubs where there is no speaker is seven out of the nine different hubs, the reduced size and the location of an image to be displayed in the reduced size are set such that the seven images received from the seven different hubs (for example, different hubs A, B, C, E, G, H, and I) are located in different locations of the display surface. In FIG. 13, part of the images received from the different hubs A, B, C, E, G, H, and I hide behind the image received from the different hub D or F.

Moreover, for example, as illustrated in FIG. 14, if the number of different hubs where there is no speaker is six out of the nine different hubs, the reduced size and the location of an image to be displayed in the reduced size are set such that the six images received from the six different hubs (for example, different hubs A, C, D, F, G, and I) are located in different locations of the display surface. In FIG. 14, part of the images received from the different hubs A, C, D, F, G, and I hide behind the image received from at least one of the different hubs B, E and H.

At the next Step S21, the image received from a different hub whose sound volume level is less than the threshold is displayed on the set location in the set reduced size (see FIGS. 12 to 15). After Step S21 is performed, the flow returns to Step S1.

As described above, the teleconference device 100 of the present embodiment is a communication device that is used in an arbitrary hub to hold a teleconference (share information) by transmitting and receiving an image and a sound among at least three hubs (e.g., ten hubs) via the Internet (communication network), and the communication device includes the determination unit including the sound-volume level determination unit 160 that determines whether there is a speaker in at least two different hubs (e.g., nine different hubs) that are different from the hub by using at least two (e.g., nine) sets of sound data (sound-related information) that are individually transmitted via the Internet from the different hubs; and a display unit including the display processing unit 140 that displays, in a reduced size (predetermined size) on a display surface, an image that is transmitted via the Internet from a different hub for which the determination unit determines that there is no speaker and that displays, in an enlarged size that is larger than the reduced size on the display surface, an image that is transmitted via the Internet from a different hub for which the determination unit determines that there is a speaker. When there is a speaker at each of the multiple different hubs, the display unit collectively displays, in the enlarged size on the display surface, multiple images that are individually transmitted from the multiple different hubs.

In this case, if there is a speaker at each of multiple different hubs, the multiple images received from the multiple different hubs are collectively displayed on the display surface in an enlarged size.

As a result, if there are speakers at multiple different hubs, the speakers can be easily recognized (determined). That is, if the multiple different hubs are in a state for communications, the multiple different hubs that are in a state for communications can be easily recognized (determined).

Furthermore, when it is assumed that the sound volume level of each of at least two different hubs is continuously equal to or greater than a threshold for a predetermined time, the determination unit determines that there is a speaker at the different hub; therefore, the reliability of determination is high. Conversely, if a different hub whose sound volume level is equal to or greater than the threshold at a certain time is uniformly determined to be a hub where there is a speaker, a conference participant who nods, for example, and is not actually a speaker is assumed to be a speaker; therefore, it is not based on the actual circumstances and the reliability of determination is low.

Furthermore, the display unit sets the enlarged size in accordance with the number of different hubs for which the determination unit determines that there is a speaker; therefore, it is possible to make it easy to view the images received from the different hubs regardless of the number of different hubs.

Furthermore, in a comparative example illustrated in (A) and (B) of FIG. 16, out of the multiple different hubs, a different hub whose sound volume level is highest is determined to be a different hub where there is a speaker (for example, a different hub A' or a different hub B'), only the different hub is displayed in an enlarged size, and the rest of the different hubs are displayed in a reduced size. In this case, if there are speakers at multiple different hubs, the image displayed in an enlarged size is switched frequently; therefore, it is difficult to recognize (determine) the multiple different hubs where speakers currently exist. Furthermore, it is also difficult to recognize (determine) which different hubs are the multiple different hubs that are in a state for communications. Moreover, if image recording/sound recording is made on a teleconference by using a medium and it is reproduced and viewed from the medium, it is difficult to recognize (determine) which different hubs are the multiple different hubs that are in a state for communications.

Figure 17:
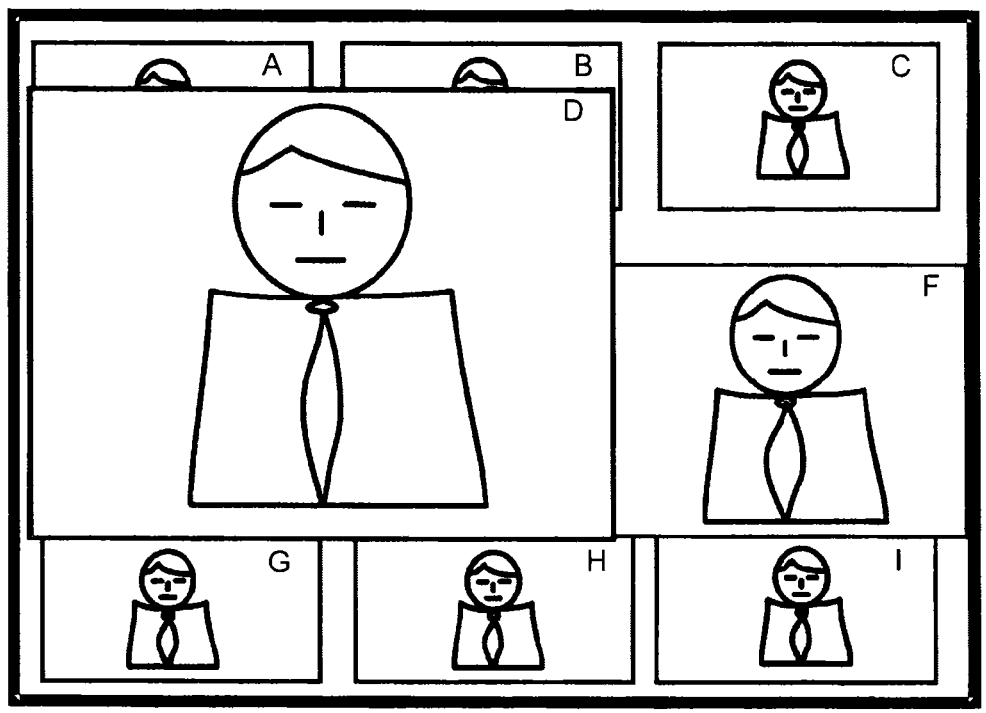
FIG. 17 is a diagram that illustrates a state where the image that is received from a different hub and that is presented in an enlarged size on the display of the teleconference device is enlarged, the image that is received from another different hub and that is presented in an enlarged size is reduced, and the images received from the rest of the different hubs are presented in a reduced size.

Furthermore, in the above-described embodiment, the enlarged size of the images received from multiple different hubs where there are speakers is set to be the same size; however, this is not a limitation and, for example, as illustrated in FIG. 17, they may be different from each other. Specifically, the image received from a different hub (for example, different hub D) where a speaker is currently speaking may be displayed in a greatly enlarged size, and the image received from a different hub (for example, different hub F) where a speaker currently stops speaking may be displayed in a mildly enlarged size. Furthermore, the speech time of a different hub where there is a speaker is measured, and a different hub whose speech time is longer may be displayed in a greatly enlarged size. In this case, the enlarged size of the image received from a different hub where there is a speaker may be changed gradually or in stages in accordance with the speech time. In this case, it is preferable that, as the speech time of a different hub is longer, the enlarged size thereof is increased. To put it the other way around, it is preferable that, as the speech time of a different hub is shorter, the enlarged size thereof is reduced.

Figure 18:
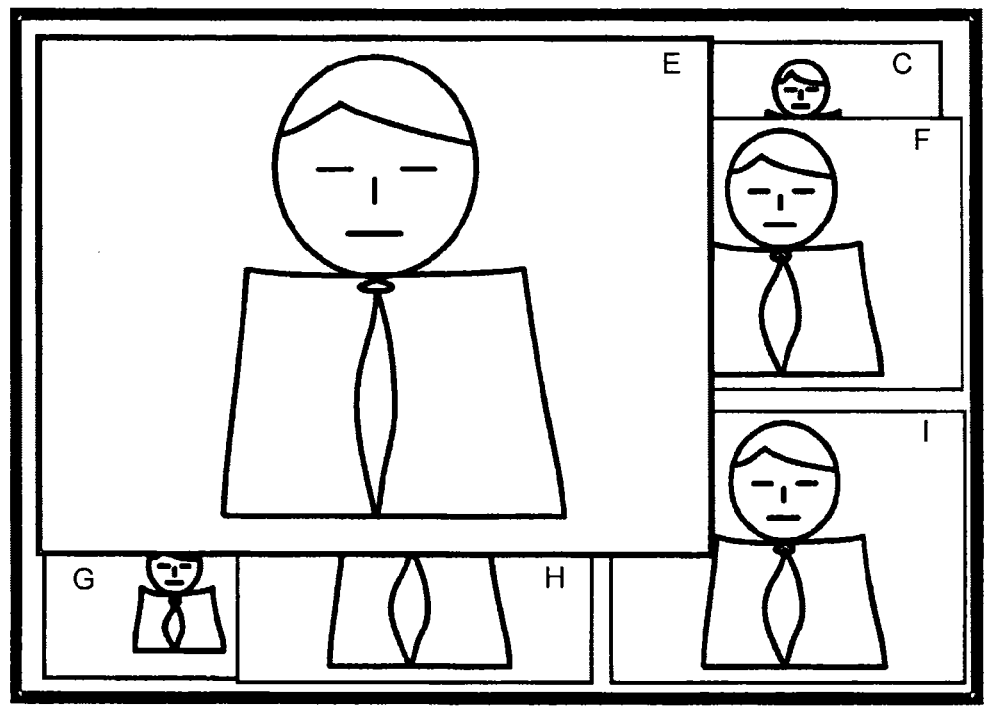
FIG. 18 is a diagram that illustrates a state where the image that is received from a different hub and that is presented in an enlarged size on the display of the teleconference device is enlarged, the images that are received from other three different hubs and that are presented in an enlarged size are reduced, and the images received from the rest of the different hubs are presented in a reduced size.

Furthermore, in the above-described embodiment, the images received from multiple different hubs where there are speakers are displayed on different locations of the display surface in an enlarged size; however, this is not a limitation and, for example, as illustrated in FIG. 18, they may be displayed such that at least parts of them are overlapped. Specifically, the image received from a different hub (for example, different hub E) where a speech is currently made may be displayed in a greatly enlarged size on the foreground, and the images received from three different hubs (for example, different hubs F, H, and I) where a speech is currently stopped may be displayed on the background in a mildly enlarged size. Specifically, multiple images of an enlarged size may be displayed such that at least parts of them are overlapped. Furthermore, in this case, the speech time of each of the multiple different hubs where there are speakers is measured and, as the speech time of a different hub is longer, the different hub may be displayed on the foreground in a greatly enlarged size. In this case, the enlarged size of the image received from a different hub where there is a speaker may be changed gradually or in stages in accordance with the speech time. In this case, it is preferable that, as the speech time of a different hub is longer, the enlarged size is increased. To put it the other way around, it is preferable that, as the speech time of a different hub is shorter, the enlarged size is reduced.

Furthermore, in actuality, it is assumed that the sound volume level becomes less than the above-described threshold in the middle of a speech (for example, in an interval of speeches, or the like). Specifically, it is assumed that, even if there is a speaker at a certain different hub, the sound volume level is equal to or greater than the threshold during the determination at Step S3 and the sound volume level is less than the threshold during the determination at Step S7. Therefore, the same sequence of steps as the sequence of steps that includes Step S5 and Step S7, for example, may be performed at least once in an interval between Step S3 and Step S5 or in an interval between Step S7 and Step S8.

Furthermore, in actuality, when there is currently a speaker at each of the multiple different hubs, the speakers often have a conversation with each other, and it is assumed that a period of speech time is different depending on the speaker. Therefore, as illustrated in (A) to (C) of FIG. 19, for example, if the multiple images received from multiple different hubs where there are speakers are displayed in the same enlarged size, an operation may be performed to discriminate the image of a different hub, out of the multiple different hubs, where a speaker is currently speaking from the image of another different hub. In this case, for example, out of the multiple different hubs where there are speakers, a different hub whose sound volume level is highest during the determination at Step S7 may be assumed to be a different hub where a speaker is currently speaking. As a result, it is possible to easily recognize a different hub where a speaker is currently speaking.

Specifically, the frame of the image received from a different hub where a speaker is currently speaking may be different from the frame of the image received from another different hub. For example, as illustrated in (A) of FIG. 19, the frame of the image received from the different hub F where a speaker is currently speaking may be displayed more thickly than the frame of the image received from another different hub D. Furthermore, for example, the line of the frame of the image received from a different hub where a speaker is currently speaking may be different from the line of the frame of the image received from another different hub. Specifically, the frame of the image received from a different hub where a speaker is currently speaking may be, for example, a solid line, and the frame of the image received from another different hub may be, for example, a broken line. Furthermore, only the frame of the image received from a different hub where a speaker is currently speaking may be, for example, a double line. Moreover, the color of the frame of the image received from a different hub where a speaker is currently speaking may be different from the color of the frame of the image received from another different hub.

Furthermore, for example, as illustrated in (B) of FIG. 19, the resolution of the image received from another different hub D may be lower than the resolution of the image received from the different hub F where a speaker is currently speaking. Furthermore, for example, the brightness of the image received from another different hub may be lower than the brightness of the image received from a different hub where a speaker is currently speaking. Furthermore, the frame rate of the image received from another different hub may be lower than the frame rate of the image received from a different hub where a speaker is currently speaking. In this case, it is possible to reduce the loads on the CPU 101 of the teleconference device 100 in a hub, and therefore it is possible to achieve a reduction of the power consumption.

Furthermore, for example, as illustrated in (C) of FIG. 19, the image received from the different hub F where a speaker is currently speaking may be subjected to an operation to add a graphic, symbol, text, number, mark, a combination of them, or the like (for example, the character "S" that is surrounded by the graphic of a circle).

Furthermore, in the above-described embodiment, it is determined, in a hub, whether the sound volume level of the sound data received from each of the different hubs is equal to or greater than the threshold during two different times (substantially continuously for a predetermined time); however, this is not a limitation. For example, it may be determined, in a different hub, whether the sound volume level of the sound data of the different hub is continuously equal to or greater than the threshold substantially for a predetermined time, and the result of a determination may be transmitted to a hub via the Internet. In this case, the determination result as to whether there is a speaker at the different hub is transmitted to the teleconference device of the hub; therefore, it is not necessary to provide the determination unit that determines whether there is a speaker, and the configuration and control can be simplified.

Furthermore, in the above-described embodiment, a teleconference is held among the ten hubs; however, this is not a limitation, and it may be held among at least three hubs. In this case, it is also preferable to provide the teleconference device 100 at each hub.

Furthermore, in the above-described embodiment, the display surface on which an image is displayed by the display unit is the display surface of the display 14; however, this is not a limitation. For example, it may be the surface of a screen (for example, in the case where the teleconference device is connected to a projector), the screen of an external monitor, the screen of a TV, the screen of a personal computer, or the like. In this case, the display 14 is not essential. Furthermore, the size of the display surface is not particularly limited.

Furthermore, in the above-described embodiment, what is called a liquid crystal display is used as the display; however, this is not a limitation, and the other displays, for example, a plasma display, organic electroluminescence (EL) display, or the like, may be used.

Furthermore, in the above-described embodiment, the electronic camera, the microphone, and the speaker are integrally installed in the chassis; however, at least one of them may be provided separately from the chassis.

Furthermore, in the above-described embodiment, the teleconference device 100 is used in one room; however, this is not a limitation. As described above, the teleconference device 100 is superior in portability; therefore, it does not need to be installed in a specific conference room, and it is expected that it can be freely carried around and be used in various places.

Furthermore, in the above-described embodiment, the present invention is applied to what is called the portable-type teleconference device 100; however, it may be applied to what is called a stationary teleconference device.

Furthermore, in the above-described embodiment, the number of users at each of the hubs is one; however, this is not a limitation, and there may be a plurality of users. In this case, for example, the image that displays all of the users in each of the hubs may be transmitted to a different hub, or the image that displays a part of the users at the hub may be transmitted to a different hub by operating the view switch button 58.

Furthermore, the program that is used in the teleconference device (also referred to as a communication device) of the above-described embodiment to execute the sequence of operations illustrated in FIG. 11, for example, is provided by being stored, in the form of a file that is installable and executable, in a storage medium readable by a computer, such as a CD-ROM, a flexible disk (FD), a CD-R, or a digital versatile disk (DVD).

Furthermore, a configuration may be such that the program that is used in the teleconference device (also referred to as a communication device) of the above-described embodiment to execute the sequence of operations illustrated in FIG. 11, for example, is stored in a computer that is connected via a network, such as the Internet, and is provided by being downloaded via the network. Moreover, a configuration may be such that the program for executing the flow that is performed by the teleconference device (also referred to as a communication device) of the above-described embodiment is provided or distributed via a network, such as the Internet.

Moreover, a configuration may be such that the program that is used in the teleconference device (also referred to as a communication device) of the above-described embodiment to execute the sequence of operations illustrated in FIG. 11, for example, is provided such that it is previously installed in a ROM, or the like.

An explanation is given, in the above-described embodiment, of a case where the present invention is applied to a dedicated device for a teleconference; however, it may be applied to any devices if the device is a personal computer, smartphone, or the like, that has a camera and a sound input capability.

Furthermore, an explanation is given in the above-described embodiment by using the teleconference device 100 that is used for a teleconference as an example of the communication device; however, this is not a limitation. Specifically, the communication device according to the present invention can be used in various forms as a communication tool that is used for sharing information by transmitting and receiving images and sounds among at least three hubs.

Thus, when there are speakers at multiple different hubs, the speakers can be easily recognized.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication device that is used in one of at least three hubs to share information by transmitting and receiving an image and a sound among the at least three hubs via a communication network, the communication device comprising:
    circuitry configured to
        determine whether there is a speaker in at least two different hubs that are different from the one of the at least three hubs by using at least two sets of sound-related information that are transmitted from the respective different hubs via the communication network; and
        control display of, in a predetermined size on a display, an image that is transmitted via the communication network from a different hub in which the circuitry determines that there is no speaker, and that controls display of, in an enlarged size that is larger than the predetermined size on the display, an image that is transmitted via the communication network from a different hub in which the circuitry determines that there is a speaker, wherein
    when the circuitry determines that there are speakers in multiple different hubs, the circuitry controls the display to collectively display, in the enlarged size on the display, multiple images that are transmitted from the respective different hubs via the communication network, and
    wherein the circuitry makes a first determination at a first time as to whether there is a different hub that has a sound volume level greater than or equal to a threshold, the circuitry makes a second determination at a second time, that is a predetermined amount of time after the first time, as to whether there is a different hub that has a sound volume level greater than or equal to the threshold, and the circuitry determines that there is a speaker in a different hub based on a sound volume level of the different hub being equal to or greater than the threshold at both the first determination and the second determination.

2. The communication device according to claim 1, wherein the circuitry controls the display to set the enlarged size in accordance with the number of different hubs each in which the circuitry determines that there is a speaker.

3. The communication device according to claim 1, wherein, to display, in the enlarged size, the image that is received from the different hub and that is displayed in the predetermined size, the circuitry controls the display to gradually enlarge the image.

4. The communication device according to claim 1, wherein, to display, in the predetermined size, the image that is received from the different hub and that is displayed in the enlarged size, the circuitry controls the display to gradually reduce the image.

5. The communication device according to claim 1, wherein, when the circuitry determines that there are speakers in the multiple different hubs, the circuitry controls the display to set the enlarged size of multiple images received from the multiple different hubs to an identical size and perform an operation to visually discriminate an image received from a different hub where a speaker is currently speaking out of the multiple images, from an image received from another different hub, the speaker that is currently speaking being determined based on having a speech time that is longer than the remaining speakers.

6. A communication method that is used in one of at least three hubs to share information by transmitting and receiving an image and a sound among the at least three hubs via a communication network, the communication method comprising:
    determining whether there is a speaker in at least two different hubs that are different from the one of the at least three hubs by using at least two sets of sound-related information that are transmitted from the respective different hubs via the communication network;
    controlling display of, in a predetermined size on a display, an image that is transmitted via the communication network from a different hub in which it is determined that there is no speaker; and
    controlling display of, in an enlarged size that is larger than the predetermined size on the display, an image that is transmitted via the communication network from a different hub in which it is determined that there is a speaker, wherein
    the controlling the display in the enlarged size includes controlling the display to collectively display, in the enlarged size, multiple images that are transmitted from the respective different hubs via the communication network when it is determined that there are speakers in multiple different hubs, and
    wherein the method includes making a first determination at a first time as to whether there is a different hub that has a sound volume level greater than or equal to a threshold, making a second determination at a second time, that is a predetermined amount of time after the first time, as to whether there is a different hub that has a sound volume level greater than or equal to the threshold, and determining that there is a speaker in a different hub based on a sound volume level of the different hub being equal to or greater than the threshold at both the first determination and the second determination.

7. The communication method according to claim 6, wherein the determining includes setting the enlarged size in accordance with the number of different hubs each in which it is determined that there is a speaker.

8. A non-transitory computer-readable storage medium with an executable program stored thereon and executed by a computer of an communication device that is used in one of at least three hubs to share information by transmitting and receiving an image and a sound among the at least three hubs via a communication network, wherein the program instructs the computer to perform:
    determining whether there is a speaker in at least two different hubs that are different from the one of the at least three hubs by using at least two sets of sound-related information that are transmitted from the respective different hubs via the communication network;

controlling display of, in a predetermined size on a display, an image that is transmitted via the communication network from a different hub in which it is determined that there is no speaker; and controlling display of, in an enlarged size that is larger than the predetermined size on the display surface, an image that is transmitted via the communication network from a different hub in which it is determined that there is a speaker, wherein the controlling the display in the enlarged size includes controlling the display to collectively display, in the enlarged size, multiple images that are transmitted from the respective different hubs via the communication network when it is determined that there are speakers in multiple different hubs, and wherein the method includes making a first determination at a first time as to whether there is a different hub that has a sound volume level greater than or equal to a threshold, making a second determination at a second time, that is a predetermined amount of time after the first time, as to whether there is a different hub that has a sound volume level greater than or equal to the threshold, and determining that there is a speaker in a different hub based on a sound volume level of the different hub being equal to or greater than the threshold at both the first determination and the second determination.

* * * * *